(12) United States Patent
Reuteler

(10) Patent No.: US 11,179,898 B2
(45) Date of Patent: Nov. 23, 2021

(54) TUBE SEALER

(71) Applicant: Brooks Automation, Inc., Chelmsford, MA (US)

(72) Inventor: Beat Reuteler, Butzberg (CH)

(73) Assignee: BROOKS AUTOMATION, INC., Chelmsford, MA (US)

( * ) Notice: Subject to any disclaimer, the term of this patent is extended or adjusted under 35 U.S.C. 154(b) by 0 days.

(21) Appl. No.: 17/133,236

(22) Filed: Dec. 23, 2020

(65) Prior Publication Data

US 2021/0114313 A1    Apr. 22, 2021

Related U.S. Application Data

(62) Division of application No. 15/545,394, filed as application No. PCT/US2016/016720 on Feb. 5, 2016, now Pat. No. 10,875,255.

(Continued)

(51) Int. Cl.
*B32B 41/00* (2006.01)
*B29C 65/74* (2006.01)
(Continued)

(52) U.S. Cl.
CPC .......... *B29C 65/7437* (2013.01); *B29C 65/18* (2013.01); *B29C 65/749* (2013.01);
(Continued)

(58) Field of Classification Search
CPC . B29C 65/7437; B29C 65/749; B29C 66/114; B29C 69/005; B29C 66/8432;
(Continued)

(56) References Cited

U.S. PATENT DOCUMENTS

| | | |
|---|---|---|
| 5,374,179 A | 12/1994 | Swanson |
| 6,787,959 B2 | 9/2004 | Weimer |

(Continued)

FOREIGN PATENT DOCUMENTS

| | | |
|---|---|---|
| CN | 101143497 A | 3/2008 |
| CN | 202337009 U | 7/2012 |

(Continued)

OTHER PUBLICATIONS

International Search Report and the Written Opinion of the International Searching Authority for International Application No. PCT/US2016/016720, entitled: Tube Sealer, dated Apr. 4, 2016.

*Primary Examiner* — Michael N Orlando
*Assistant Examiner* — Joshel Rivera
(74) *Attorney, Agent, or Firm* — Hamilton, Brook, Smith & Reynolds, P.C.

(57) ABSTRACT

A device for sealing sample tubes comprises a tool assembly configured to interface with a rack holding a plurality of sample storage tubes, the tool assembly holding a plurality of punches and a die plate including a plurality of cutting holes, with each of the plurality of cutting holes accepting one of the plurality of punches. The tool assembly receives a foil sheet between the punches and the die plate. The device includes an actuator enabling linear movement of the tool assembly. Linear movement of the tool assembly towards the rack engages the die plate against the rack and punches the punches through the cutting holes of the die plate to punch a plurality of sealing sections from the foil sheet and to press and seal each of the sealing sections against a top end of each of the plurality of sample storage tubes in the rack.

15 Claims, 16 Drawing Sheets

Related U.S. Application Data

(60) Provisional application No. 62/112,936, filed on Feb. 6, 2015.

(51) Int. Cl.

| | |
|---|---|
| *B29C 65/18* | (2006.01) |
| *B29C 65/78* | (2006.01) |
| *B29C 65/00* | (2006.01) |
| *B65B 7/16* | (2006.01) |
| *B29C 69/00* | (2006.01) |
| *B65B 51/14* | (2006.01) |
| *B29L 31/00* | (2006.01) |

(52) U.S. Cl.
CPC ........ *B29C 65/7861* (2013.01); *B29C 66/112* (2013.01); *B29C 66/114* (2013.01); *B29C 66/53461* (2013.01); *B29C 66/81812* (2013.01); *B29C 66/8227* (2013.01); *B29C 66/8322* (2013.01); *B29C 66/849* (2013.01); *B29C 66/8432* (2013.01); *B29C 66/91231* (2013.01); *B29C 66/91423* (2013.01); *B29C 69/005* (2013.01); *B65B 7/161* (2013.01); *B65B 7/164* (2013.01); *B65B 51/142* (2013.01); *B29C 66/71* (2013.01); *B29C 66/73921* (2013.01); *B29C 66/81821* (2013.01); *B29C 2793/0009* (2013.01); *B29C 2793/0081* (2013.01); *B29L 2031/712* (2013.01); *B29L 2031/753* (2013.01)

(58) Field of Classification Search
CPC ... B29C 66/8322; B29C 66/112; B29C 65/18; B29C 65/7861; B29C 66/53461; B29C 66/81812; B29C 66/8227; B29C 66/849; B29C 66/91231; B29C 66/91423; B29C 66/71; B29C 2793/0009; B29C 2793/0081; B29C 66/73921; B29C 66/81821; B29C 65/74; B29C 69/001; B65B 7/161; B65B 7/164; B65H 51/142; B29L 2031/753; B29L 2031/712
USPC ................... 156/60, 64, 350, 351, 378, 379
See application file for complete search history.

(56) References Cited

U.S. PATENT DOCUMENTS

| | | |
|---|---|---|
| 2004/0007329 A1 | 1/2004 | Gill et al. |
| 2008/0148690 A1 | 6/2008 | Seggem |
| 2013/0028697 A1 | 1/2013 | Neeper |

FOREIGN PATENT DOCUMENTS

| | | |
|---|---|---|
| EP | 1935789 A1 | 6/2008 |
| FR | 1457943 A | 11/1966 |
| FR | 2303718 A1 | 10/1976 |
| JP | 57-078161 A | 5/1982 |
| JP | 58-059057 A | 4/1983 |
| JP | 08-052695 A | 2/1996 |
| JP | 10-068732 A | 3/1998 |
| JP | 2003-094386 A | 4/2003 |
| JP | 36-14389 B | 1/2005 |
| JP | 2005-183501 A | 7/2005 |
| JP | 2012-166235 A | 9/2012 |
| JP | 56-012536 B | 10/2014 |

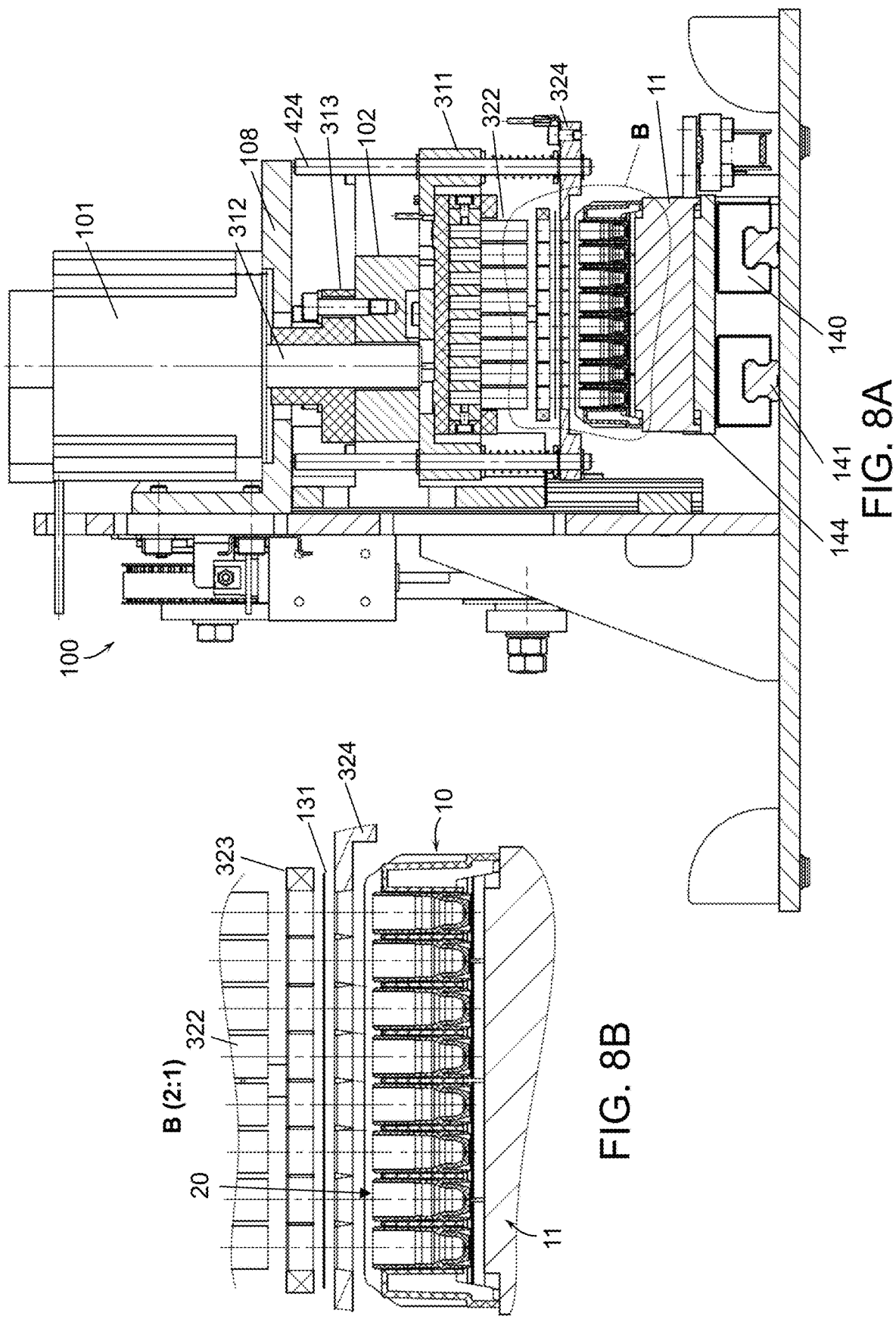

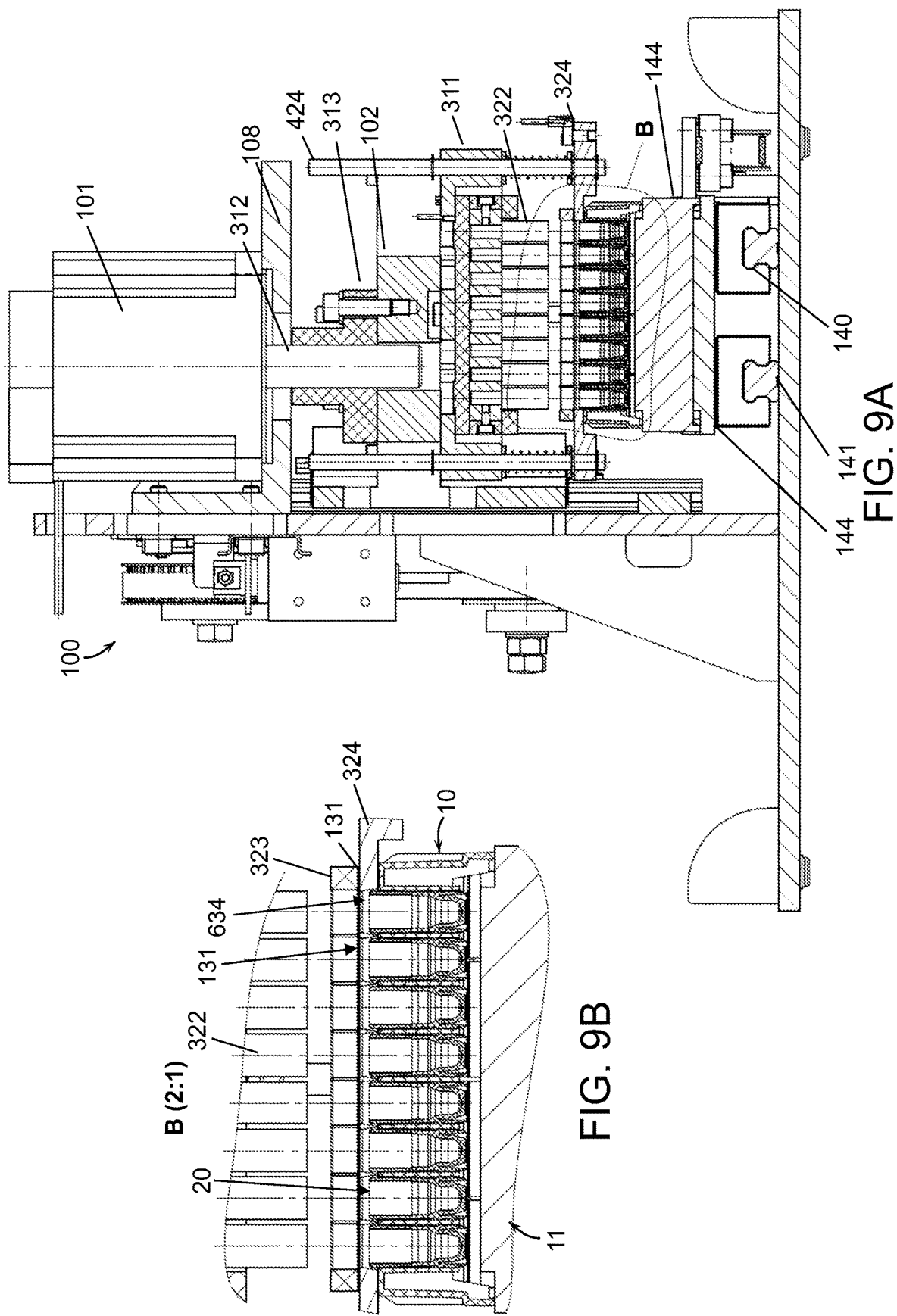

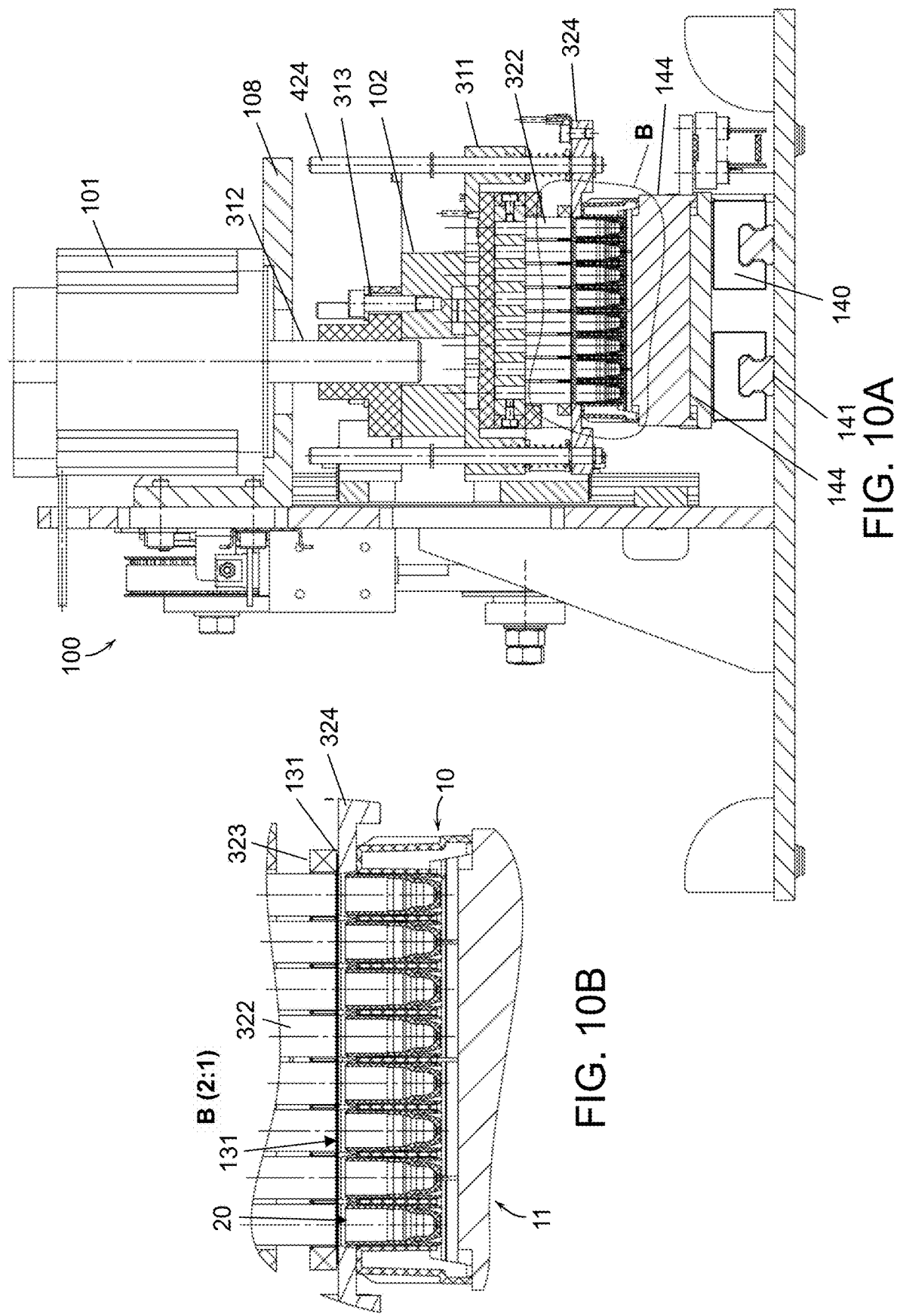

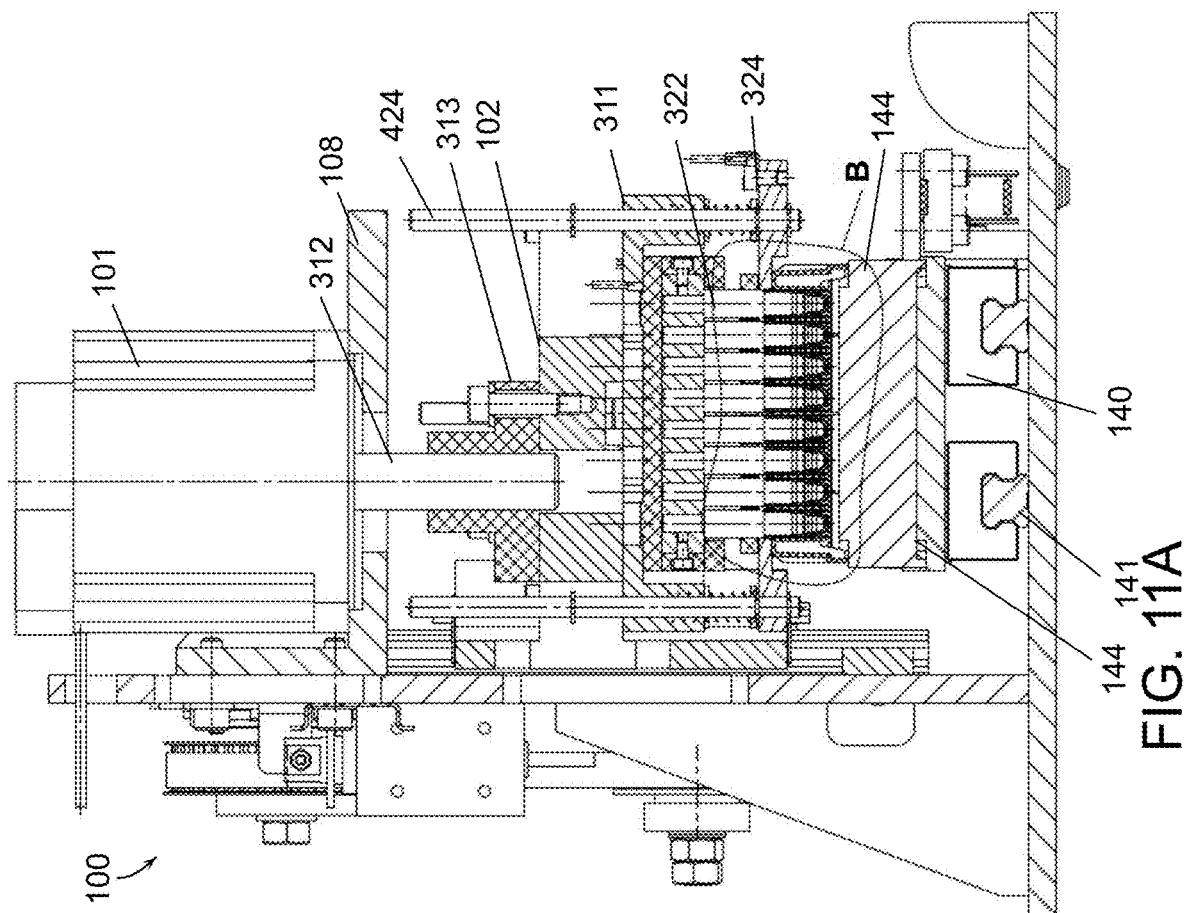
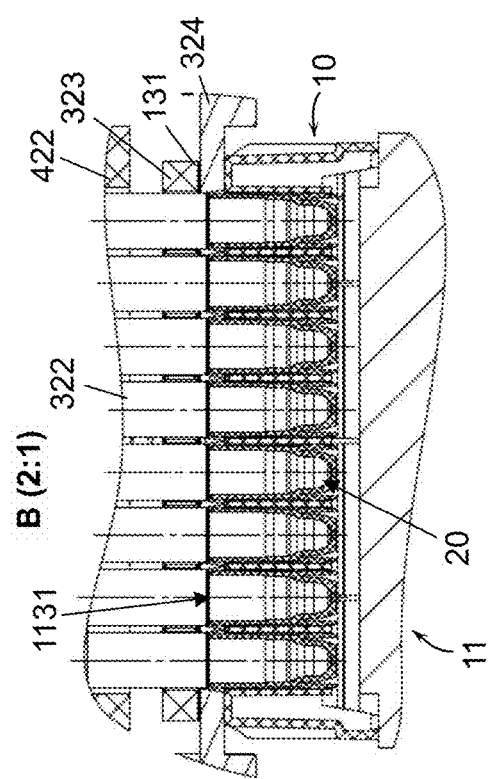
FIG. 11A
FIG. 11B

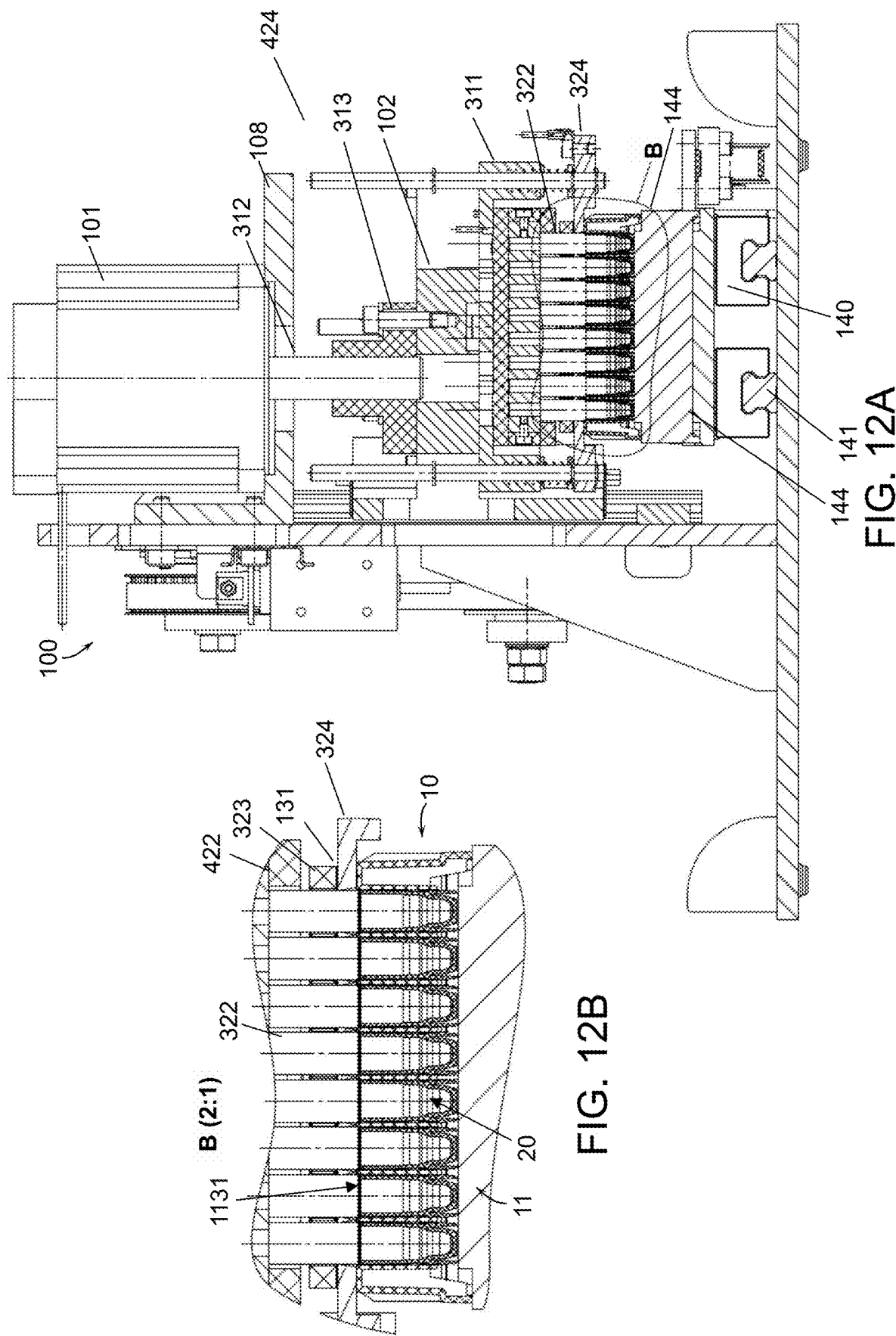

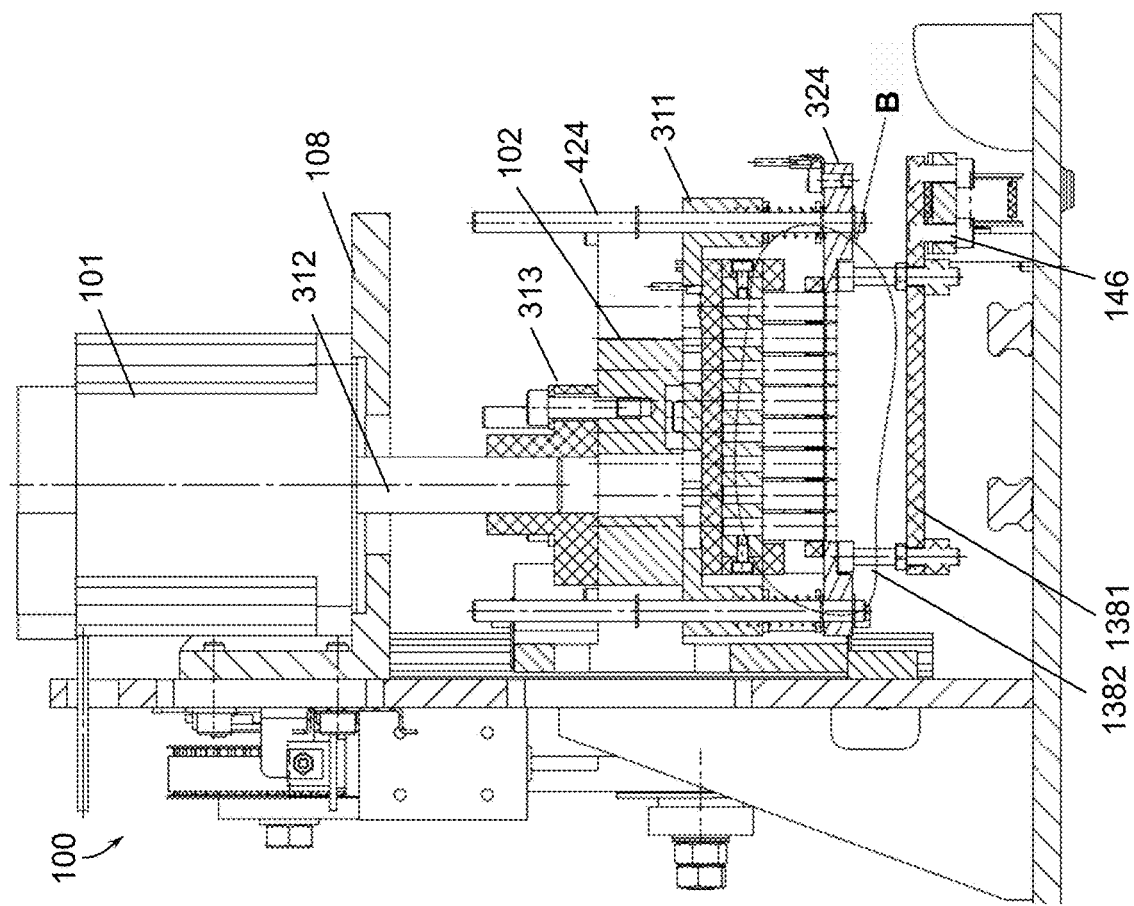
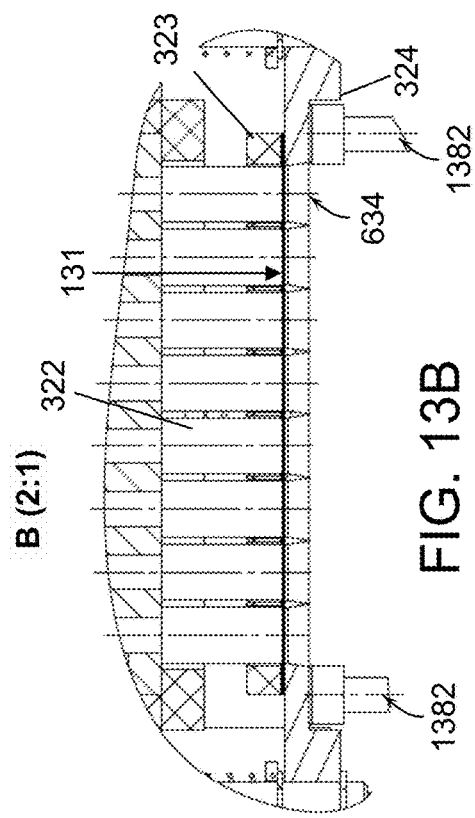

TUBE SEALER

RELATED APPLICATION(S)

This application is a divisional of U.S. application Ser. No. 15/545,394, filed Jul. 21, 2017, now U.S. Pat. No. 10,875,255, which is the U.S. National Stage of International Application No. PCT/US2016/016720, filed on Feb. 5, 2016, published in English, which claims the benefit of U.S. Provisional Application No. 62/112,936, filed on Feb. 6, 2015. The entire teachings of the above applications are incorporated herein by reference.

BACKGROUND OF THE INVENTION

High density storage of biological samples typically employs storage of the biological samples in individual sample storage tubes, with the sample storage tubes grouped together on large storage racks for transport and storage efficiency and categorization. Typically used in laboratory automation, known cut seal punch (CSP) devices are dedicated to sealing tubes held as an array in a tube rack using a welding process also known as heat sealing. CSP devices seal the biological samples in the tubes by placing a foil seal across the top of the tube. Typically, these devices input racks containing 96 or 384 unsealed sample storage tubes and place a seal across all of the tubes in one operation. There are also devices known as plate sealers which are dedicated to sealing similarly sized sample receptacles, for example, multiwell plates or microplates. CSP devices, unlike plate sealers, not only seal off the tubes, but also cut out a circle shape seal from a sheet of foil and push the tubes down into their final position in the rack. This individual sealing process is necessary to have the tubes individually accessible for later use of the sample, as compared to them being welded together with the foil sheet.

Existing CSP devices seal all the sample storage tubes held by one tube rack at once, typically using a tool in the shape of a heated sealing plate. The cutting process typically takes place after sealing using a tool consisting of a die plate and typically 96 or 384 cutting dies. Typically the same tool is used to punch the tubes further downwards until they sit at a required position in the rack. Some existing CSP devices use a third tool to apply a necessary reaction force during the sealing process. In other known devices, the third tool is used to push the tubes upwards so they stand proud from the upper edge of the rack. Once such device is Applicant's CSP384-RS device, which inputs a rack containing 384 sample storage tubes and subject them to the following process: First, the rack is transported into the device and ejector pins lift each of the sample storage tubes upwards, through a cutting die, and against a foil sheet while a heated sealing plate is pressed against the other side of the foil sheet, sealing the tubes against the foil sheet. Second, the ejector pins are retreated from the rack and a plurality of punches are driven though the cutting die, cutting individual sealing sections from the foil sheet and pushing the sealed sample storage tubes back into the rack.

SUMMARY OF THE INVENTION

One example embodiment of the present invention is a device for sealing sample tubes comprising a tool assembly configured to interface with a rack holding a plurality of sample storage tubes, the tool assembly comprises a plurality of punches and a die plate including a plurality of cutting holes, with each of the plurality of cutting holes accepting one of the plurality of punches. The tool assembly receives a foil sheet between the punches and the die plate. The device includes an actuator enabling linear movement of the tool assembly. Linear movement of the tool assembly towards the rack engages the die plate against the rack and punches the punches through the cutting holes of the die plate to punch a plurality of sealing sections from the foil sheet and to press and seal each of the sealing sections against a top end of each of the plurality of sample storage tubes in the rack.

In some embodiments, the plurality of punches is a plurality of heated punches.

In some embodiments, the foil sheet includes a polymer layer facing the die plate, where pressing each of the sealing sections against a top end of each of the plurality sample storage tubes in the rack includes each of the plurality of heated punches welding the polymer layer of each sealing section against the end of the sample storage tube.

In some embodiments, the tool assembly further includes a mounting member holding the plurality of punches and a foil guard between the plurality of heated punches and the die plate, the foil guard being suspended from the mounting member to enable movement of the foil guard towards the mounting member, where linear movement of the tool assembly towards the rack (i) engages the die plate against the rack, (ii) continues movement to move the foil guard toward the foil sheet and die plate, and (iii) continues movement to move the plurality of punches through the cutting holes of the die plate to punch a plurality of sealing sections from the foil sheet and to press and seal each of the sealing sections against a top end of each of the plurality sample storage tubes in the rack. Linear movement of the tool assembly against the rack may press the foil guard against the foil sheet or position the foil guard in close proximity to the foil sheet and the die plate before continued linear movement of the tool assembly punches the plurality of sealing sections from the foil sheet.

The foil guard may be slideably coupled to the mounting member with at least one foil guard spring. The at least one foil guard spring applies a foil guard restoring force on the foil guard when the foil guard is moved towards the mounting member. The die plate is slideably coupled to the mounting member with at least one die plate spring, and the at least one die plate spring applies a die plate restoring force on the die plate when the die plate is moved toward the mounting member. In some embodiments, after punching a plurality of sealing sections from the foil sheet, and during linear movement of the tool assembly away from the rack, the foil guard restoring force moves the foil guard and foil sheet away from the plurality of heated punches, and the die plate restoring force moves the die plate away from the foil guard, enabling movement of the foil sheet.

The device may include a bottom plate positioned under the rack, wherein the rack enables the plurality of sample storage tube to slide vertically in the rack, and wherein pressing the sealing sections against the top end of a sample storage tube in the rack moves a bottom end of the plurality of sample storage tubes against the bottom plate.

Each of the plurality of cutting holes of the die plate may be configured to surround one of the plurality of sample storage tubes when the die plate is engaged with the rack.

In some embodiments, the plurality of heated punches are configured to collide with the die plate when the temperature of the heated punches equals the temperature of the die plate, but pass through the cutting holes after heating of the plurality of heated punches creates a temperature difference between the die plate and the heated punches. The plurality of heated punches may be adapted to transfer heat to the die plate and passively maintain the temperature difference between the temperature of the heated punches and the temperature of the die plate. The mounting member may further include a first temperature sensor sensing a temperature of the plurality of heated punches and the die plate includes a second temperature sensor sensing a temperature of the die plate, and timing of close thermal coupling between the heated punches and die plate is controlled to maintain the temperature differential to allow the plurality of heated punches to pass through the plurality of cutting holes.

In some embodiments, the device includes a heat sink adapted to receive the die plate and absorb heat energy from the die plate and a stop adapted to receive the die plate, the stop enabling movement of the tool assembly to move the plurality of heated punches into close thermal coupling with the die plate to passively heat the die plate.

An example embodiment of the present invention is a method of sealing sample tubes comprising the steps of: (a) positioning a tool assembly above a rack, the rack holding a plurality of sample storage tubes, (b) moving the tool assembly towards the rack, the moving engaging a die plate of the tool assembly against the rack, (c) punching a plurality of heated punches through a foil sheet and corresponding cutting holes in the die plate to punch a plurality of sealing sections from the foil sheet, and (d) with the plurality of punches, pressing each of the plurality of sealing sections against a top end of each of the plurality of sample storage tubes to seal a top end of each of the sample storage tubes with the sealing section.

Another example embodiment is a method of sealing sample tubes comprising the steps of: (a) positioning a tool assembly above a rack, the rack holding a plurality of sample storage tubes, (b) moving the tool assembly towards the rack, the moving engaging a die plate of the tool assembly against the rack, (c) with the die plate engaging the rack, moving a foil guard of the tool assembly toward a foil sheet positioned between the die plate and the foil guard, (d) punching a plurality of punches of the tool assembly through the foil sheet and corresponding cutting holes in the die plate to punch a plurality of sealing sections from the foil sheet, and (e) with the plurality of punches, pressing each of the plurality of sealing sections against a top end of each of the plurality of sample storage tubes to seal a top end of each of the sample storage tubes with the sealing section.

Yet another example embodiment is a method of sealing sample tubes comprising the steps of: (a) positioning a tool assembly above a rack, the rack holding a plurality of sample storage tubes, (b) moving the tool assembly towards the rack, the moving engaging a die plate of the tool assembly against the rack, (c) with the die plate engaging the rack, moving a foil guard of the tool assembly toward a foil sheet positioned between the die plate and the foil guard, the foil sheet including a polymer layer facing the die plate, (d) punching a plurality of heated punches through the foil sheet and corresponding cutting holes in the die plate to punch a plurality of sealing sections from the foil sheet, and (e) with the plurality of heated punches, pressing the polymer layer of each of the plurality of sealing sections against a top end of each of the plurality of sample storage tubes to seal a top end of each of the sample storage tubes with the sealing section by welding the polymer layer of each sealing section to the top end of each of the sample storage tubes. The method may include, with the die plate engaging the rack, continuing to move the tool assembly towards the rack to punch the plurality of punches through the foil sheet.

In some embodiments, continuing to move the tool assembly towards the rack further applies a die plate restoring force on the die plate, the die plate restoring force moving the die plate away from the plurality of heated punches during movement of the tool assembly away from the rack.

In some embodiments, with the die plate engaging the rack, continuing to move the tool assembly towards the rack punches the plurality of punches through the foil sheet and moves the foil guard of the tool assembly toward the foil sheet. Continuing to move the tool assembly towards the rack may include applying a die plate restoring force on the die plate and applying a foil guard restoring force on the foil guard, and, during movement of the tool assembly away from the rack, the foil guard restoring force moving the foil guard and the foil sheet away from the plurality of punches and the die plate restoring force moving the die plate away from the plurality of heated punches.

The method may include heating the plurality of heated punches to creates a temperature difference between the die plate and the heated punches to prevent colliding at least one of the plurality of heated punches with a die plate, and transferring heat to the die plate from the heated punches, the transferring heat maintaining the temperature difference between the temperature of the heated punches and the temperature of the die plate. In some embodiments, the method includes sensing the temperature of the plurality heated punches, sensing the temperature of the die plate. Maintaining the temperature difference between the temperature of the heated punches and the temperature of the die plate may include controlling a duration of close thermal coupling between the plurality of heated punches and the die plate, or it may also include controlling a duration of engagement of the die plate with a heat sink to allow the plurality of heated punches to pass through the plurality of cutting holes.

In some embodiments, the method includes providing a heat sink adapted to receive the die plate and absorb heat energy from the die plate, wherein moving the tool assembly towards the heat sink engages the die plate of the tool assembly against the heat sink to passively cool down the die plate, and providing a stop adapted to receive the die plate, wherein moving the tool assembly against the stop moves the plurality of heated punches into close thermal coupling with the die plate to passively heat the die plate.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 8A-B are cross-sections of a CPS device embodiment showing a CPS tool assembly positioned above a plurality of sample storage tubes in a rack.

FIGS. 9A-B are cross-sections of a CPS device embodiment of FIG. 8A, showing the CPS tool assembly lowered and the die plate engaging the rack.

FIGS. 10A-B are cross-sections of a CPS device embodiment of FIG. 8A, showing the CPS tool assembly lowered and the heated punches engaging the foil sheet.

FIGS. 11A-B are cross-sections of a CPS device embodiment of FIG. 8A, showing the CPS tool assembly lowered and the punches driven through the foil sheet and engaging the newly cut sealing sections against the sample storage tubes.

FIGS. 12A-B are cross-sections of a CPS device embodiment of FIG. 8A showing the sample storage tubes pressed against the rack holder and sealed by the heated punches.

FIGS. 13A-B are cross-sections of a CPS device embodiment showing a CPS tool assembly engaged with a two stop pillars of a thermal control assembly to place the heated punches in close thermal coupling with the die plate.

DETAILED DESCRIPTION OF THE INVENTION

Figure 1A:
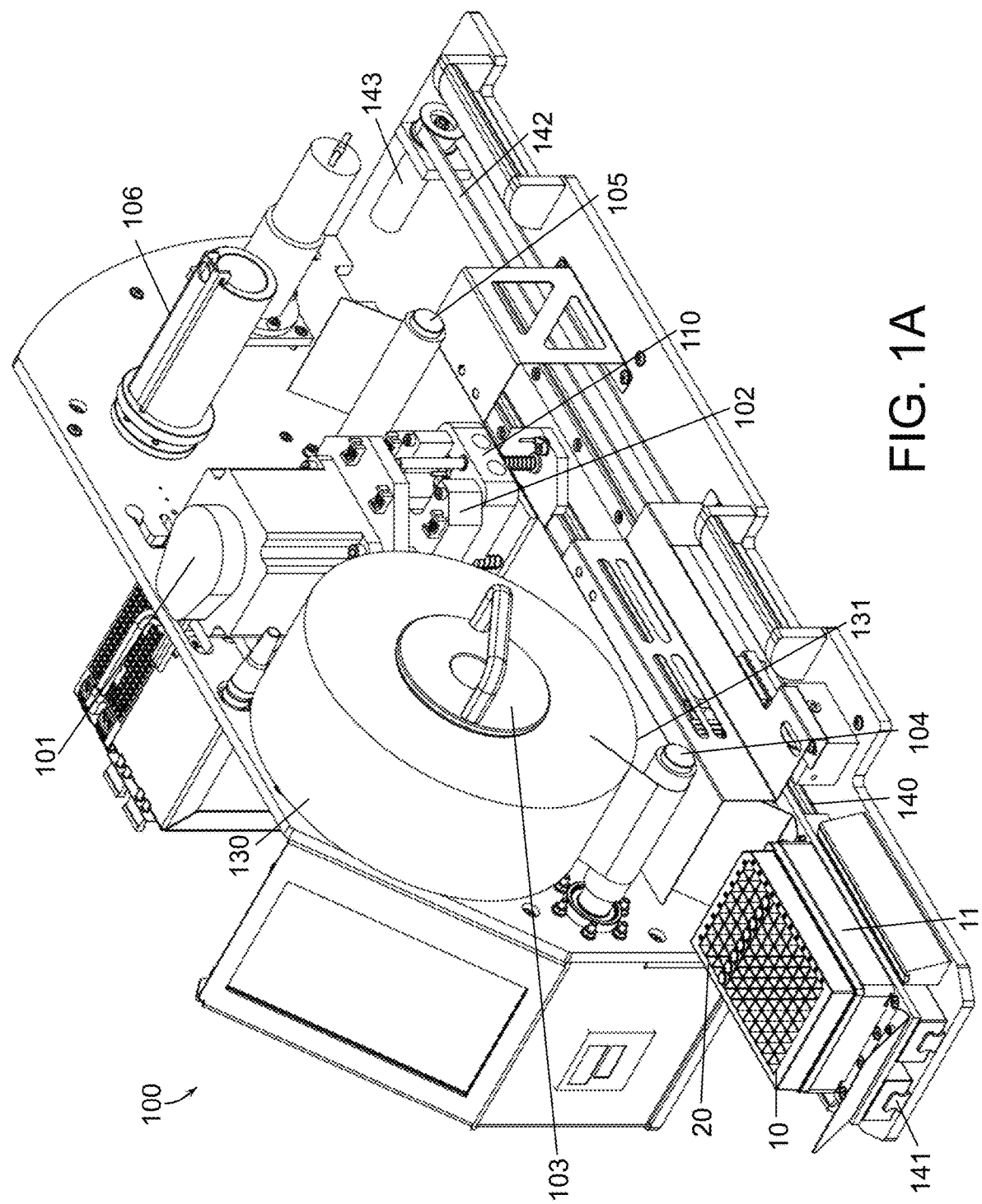
FIG. 1A is a schematic view of the Cut-Punch-Seal (CPS) device embodiment with a rack of sample storage tubes and spool of foil sheet.

A description of example embodiments of the invention follows.

Embodiments includes a device for cutting sealing sections from a foil sheet, punching sample storage tubes to their final position in a rack of sample storage tubes, and sealing the sample storage tubes with the sealing section. The device may be an electrical linear actuator driven tool assembly, without the need for additional pneumatics, to punch sealing sections from a foil sheet delivered by a reel to reel foil transport system and weld the sealing sections against the top of the sample storage tubes. The device may seal, cut and punch 8 tubes at a time or a multiple of 8 out of a 96 way rack at user's discretion. The sealing sections typically consist of a foil, for example, an Alumina—polypropylene composite, called a pierceable foil. In order for the tube rack to allow subsequent cherry picking from the rack, the sealing sections are cut in pieces small enough to seal up one tube completely and maintain the possibility to punch any selected tube out of the rack. The sealing sections may be round chips just a bit larger than the tube outer diameter. In order for the above operation to happen, the sample storage tubes stick out from the top of the rack in their original position. As part of the operation, the tubes are not only sealed, the seal being cut, but the tubes are also pushed down to their final position in the rack, typically retracted a bit from the top surface of the rack. Once this process is done, the rack is moved back out of the device.

Embodiments of the present device combine a heater plate and the cutting tool as well as the punching tool into one piece. The different steps of the function: cut, punch, seal are mechanically controlled by the one single axis that moves this tool downwards to start the cycle. A second axis is responsible for the rack to be moved in and out of the device as well as positioning the rack underneath the tool. A third axis is there to perform the reel to reel foil transport. A heating element with temperature regulation may be used to perform the sealing process at desired punch and die temperatures.

Different than with prior art designs, the present device enables control of the punching tool over the full range of temperatures and can maintain a defined or minimal temperature difference between important elements of the tool assembly, so that the punches can also serve as sealing plates during operation. In some embodiments, the tool temperature set-point will be a minimum of about 176° C. to allow a good heat seal, but can be locally as high as about 210° C. to compensate for temperature gradient throughout the tool structure. The temperature of the punches is maintained by use of a commercially available temperature regulator. On the other hand, the die plate temperature may be as low as 45° C. or up to 70° C. Therefore, a typical temperature difference between punch and die plate is about 130K but can be as much as about 155K. With an example length of 63 mm, such a temperature-induced dimensional differential between a punching tool and a die plate may be up to 0.078 mm, which is compensated by manufacturing the punching tool shorter when at room temperature so that the dimensions of the punching tool and the die plate are compatible at their operating temperatures. A comparably large average cutting gap between individual punches and die apertures of approximately 0.025 mm may be maintained to allow for some variance. The punching tool and die plate may be mounted centric so that only half the deflection differential comes into play.

In addition, disclosed embodiments maintain the die plate temperature by use of variable wait states in the software when it heats up with every cutting process and cools down in between. For startup, the die plate is heated to nominal temperature by approaching it with the tool, e.g., using waste energy from heating the punches to heat the die plate, thereby eliminating the need for active heating of the die plate. To enhance performance, cool down cycles can be shortened by bringing the die plate into contact with a heat sink. Using these features, disclosed embodiments may maintain a temperature differential that is more appropriate than the values mentioned above.

Prior art designs typically combine the cutting and punching function, but due to the necessary high precision of the mechanical elements of the tool, the sealing plate has been a separate item that is isolated from the cutting tool. Disclosed embodiments advantageously combine all three operations into one tool and one motion of the tool, i.e., using a single linear actuator.

Disclosed embodiments may provide a cutting tool with different dimensions for the die plate and punching tool. When cold, e.g. ambient temperature, the tool cannot operate because the punches would collide with the die plate. Typically the tool can be 0.13 mm shorter than the die plate. Presently disclosed embodiments solve this by heating the punches until the thermal deflection makes the tool grow enough to match the dimensions of the die plate. A control system may observe temperature difference between die plate and punches to enable the process. In some embodiments, two thermocouples, one for the tool and one for the die plate, provide the needed feedback.

FIG. 1A is a schematic view of the CPS device embodiment with a rack of sample storage tubes and spool of foil sheet. A cut, punch, seal (CPS) device 100 is configured to place a pierceable thermo-seal across a single row of sample storage tubes 20 positioned in a rack 10. The sample storage tubes 20 may be, for example, REMP STBR96. The CPS device 100 includes a rack sled 140, a spool of foil 130, and a linear actuator 101 connected to a tool assembly 110. The rack sled 140 travels on sled rails 141 and is connected to a belt 142 being driven by a belt motor 143. The spool of foil 130 is positioned on a source reel hub 103 and provides a foil sheet 131 to the tool assembly 110. After passing through the tool assembly 110, the foil sheet 131 is connected to a waste wheel hub 106. The foil sheet 131 is drawn from the spool of foil 130 by rotation of the waste reel hub 106 and drawn around a first foil guide 104 prior to entering the tool assembly 110 and a second foil guide 105 after exiting the tool assembly 110. The first and second foil guide 104, 105 guide the foil sheet 131 through the tool assembly 110 in a direction perpendicular to the movement of the tool assembly 110.

In operation, after a rack 10 containing sample handling tubes 20 is disposed on the rack bottom plate 11, the belt drive moves the rack 10 via the rack sled 140 under the tool assembly 110. The internal operation of the tool assembly 110 is shown in detail in FIGS. 8A-12B, but first introduced in brief. To begin the operations, the belt drive motor 143 moves a specific row of sample handling tubes 20 under the tool assembly 110 and the linear actuator 101 drives the tool assembly 110 towards the rack 10. As the tool assembly 110, containing a section of the foil sheet 131, is driven by the linear actuator 110 towards the rack 10, the tool assembly 110 engages the top of the rack 10 and positions the section of the foil sheet 131 against the tops of each of the sample storage tubes in the target row. The linear actuator 101 continues to translate the tool assembly 101 toward the rack 20 and the tool assembly 110 punches a section from the foil sheet 131, hereinafter referred to as a sealing section (shown as 1131 in FIG. 11B), corresponding to each sample handling tube 20 in the target row. As a result of the tool assembly 110 positioning the foil sheet 131 against, or very close to, the row of sample storage tubes 20, the sample storage tubes 20 are positioned in the rack 10 with a vertical standoff. The standoff provides clearance for the punching operation to cut the sealing sections from the foil sheet 131 and, in the same motion, punch the sample storage tubes 20 down against the bottom plate 11. Finally, the tool assembly 110 seals each of the sealing sections against the sample storage tubes 20 by pressing each of the sealing sections against each sample storage tube 20.

In some embodiments, the side of the foil sheet 131 adjacent or opposite to the tool assembly 110 may contain, for example, a polyethylene layer or other polymer or sealant, and the tool assembly 110 may heat the sealing sections as they are pressed against the top of the sample storage tube 20. Heating the polyethylene layer welds the sealing section to the sample storage tube 20. In operation, the polypropylene layer, after engagement with the simple storage tube 20, is melted by the tool assembly punch (not shown) and pressed into sealing contact with top of the sample storage tube 20 by the tool assembly 110. In some embodiments, the top of the sample storage tube 20 comprises polyethylene and during the sealing operation the tool assembly welds the polyethylene layer of foil sheet 131 to the polyethylene sample storage tube 20 to creating a pierceable thermo-seal.

Figure 1B:
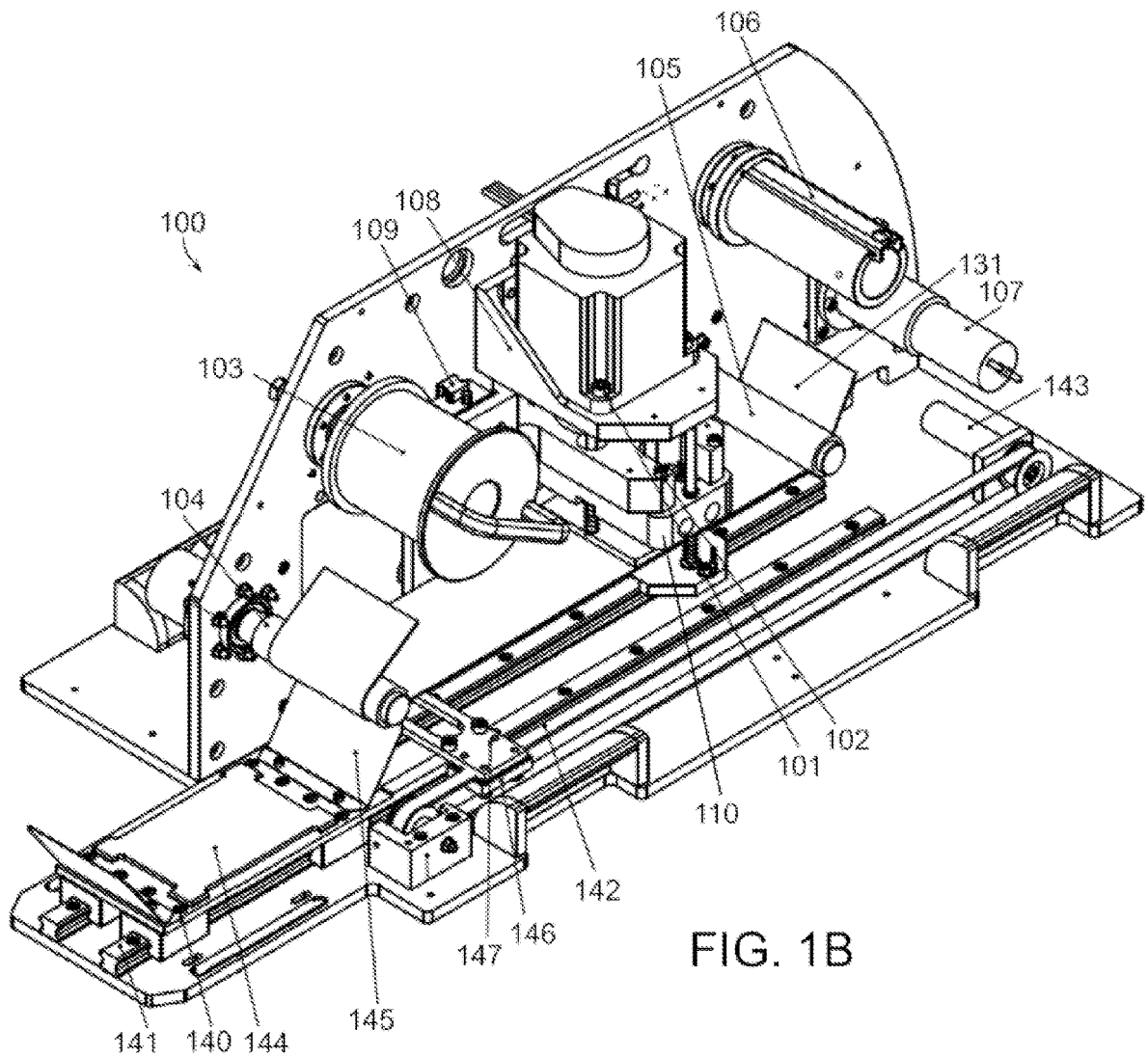
FIG. 1B the schematic view of the CPS device embodiment of FIG. 1A with the rack of sample storage tubes and spool of foil sheet removed to show additional detail.

FIG. 1B the schematic view of the CPS device embodiment of FIG. 1A with the rack of sample storage tubes and spool of foil sheet removed to show additional detail. FIG. 1B shows the rack sled 140 including a positioning form 144 to position the rack 10 and bottom plate 11 precisely during movement of the rack sled 140 under the tool assembly 110. The rack sled 140 also includes safety sheets 145 at either end of the racks sled 140. With the rack sled 140 positioned under the tool assembly 110, the safety sheets 145 prevent any unwanted intrusion, i.e., by fingers, during the punching process. The safety sheets 145 are also run alongside the bottom of the foil sheet 131 when the rack sled is moved under the tool assembly, thereby reducing the possibility of foreign objects entering or interfering with the tool assembly 110 during operation of the CPS device 100. To move rack sled 140, the rack sled 140 is attached to a tappet 146 affixed to the belt 143 driven by the belt drive motor 143. Rotation of the belt drive motor 143 translates the tappet 146, which in turn holds or pulls the rack sled 140 along the rails 141. After a cut, punch, seal operation of the tool assembly (also referred to simply as a punching operation) the tool assembly 110 is retracted by the linear actuator 101 and the foil transport drive 107 rotates the waste reel hub 106 to advance the foil sheet 131 in the tool assembly 110. Advancing the foil sheet 131 is necessary to remove the punched section of sheet from inside the tool assembly 110 and present a clean section of the foil sheet 131 for a subsequent punching operation. The first and second foil guides 104, 105 further prevent the foil section from the punched foil section from catching on any internal components of the tool assembly 110 by guiding the foil sheet 131 horizontally out of the tool assembly 110. When the tool assembly 110 is retracted, i.e., in its starting position, the foil sheet 131 may, for example, be positioned by the guides 104, 105 to make no contact with any part of the tool assembly 101, which helps ensure proper advancement of the foil sheet 131 though the tool assembly 110 after a punching operation.

Figure 2:
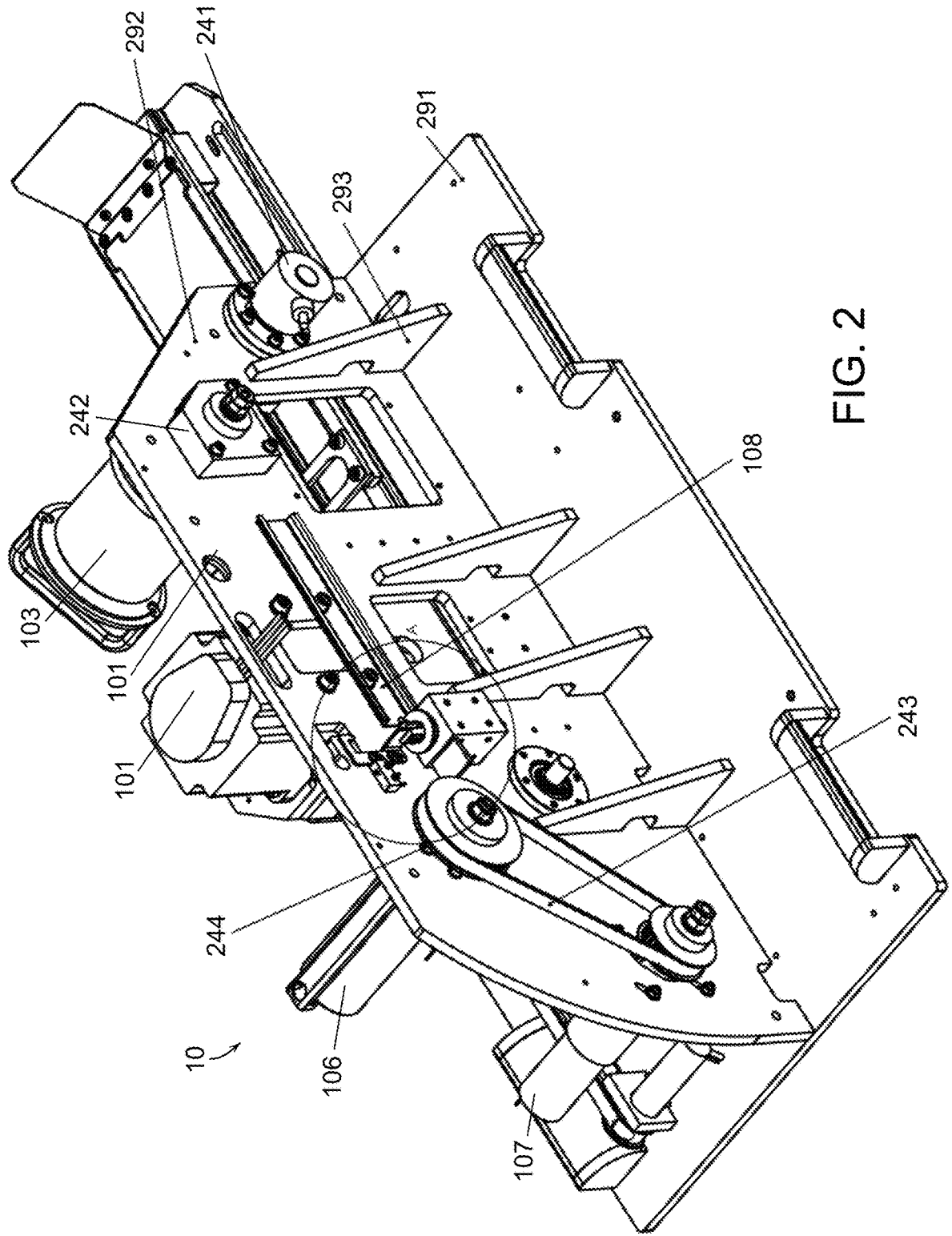
FIG. 2 is a schematic rear view of the CPS device embodiment of FIG. 1A.

FIG. 2 is a schematic rear view of the CPS device embodiment of FIG. 1A. FIG. 2 shows the backside of the CPS device of FIG. 1B. Shown in FIG. 2 is the assembly baseplate 291 to which an assembly mounting plate 292 is attached in a perpendicular orientation and supported by a plurality of gussets 293. The rail 141 and rack sled 140 system shown in FIG. 1A is secured to the assembly baseplate 291, and the tool assembly 110, linear actuator 101, and foil hubs 103, 106 and guides 104, 105 are secured to the assembly mounting plate 292. The foil transport drive 107 is connected to the waste wheel hub 106 by a foil drive belt 243, the foil drive belt 243 enables the waste reel hub 106 to be rotated by the foil transport drive 107 and advance the foil sheet 131 from the source reel 103 and around the first and second foil guides 104, 105. Additionally, the source reel hub 103 is secured to the assembly mounting plate 292 with a ratchet mechanism 242 preventing back rotation of the source reel 103 to maintain tension on the foil sheet 131. The first foil hub guide 104 connects to the assembly mounting plate 292 via an encoder 241 which precisely measures advancement of the foil sheet 131 in response to rotation of the foil transport drive 107 and waste reel hub 106.

Figure 3:
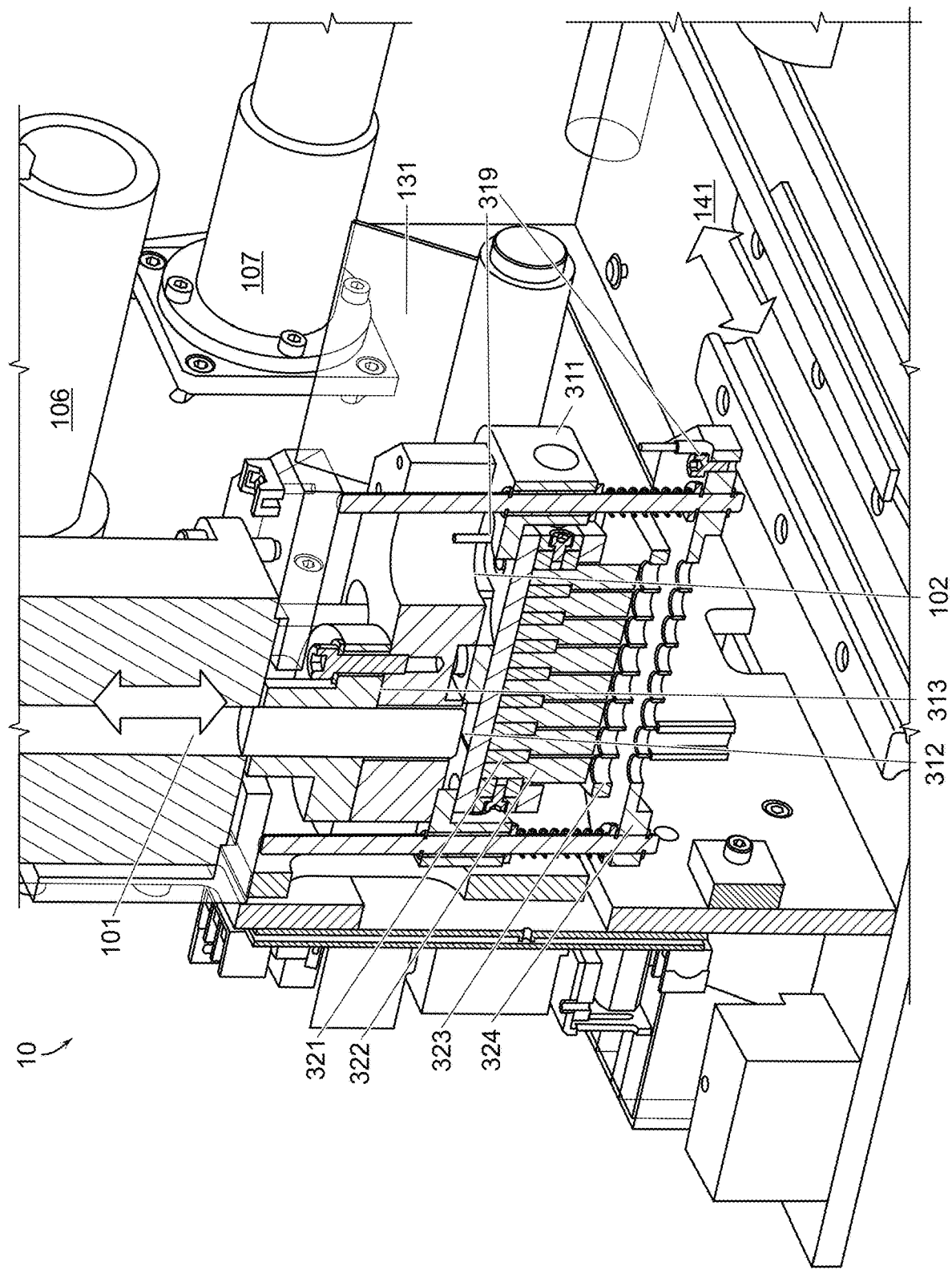
FIG. 3 is a cut-away illustration of the CPS tool assembly positioned in the CPS device.

FIG. 3 is a cut-away illustration of the CPS tool assembly positioned in the CPS device. FIG. 3 shows a cross-section of the linear actuator 101 and tool assembly 110. The tool assembly 101 includes a tool holder 311, a tool body 312 with a plurality of punches 322, a die plate 324 and a foil guard 323 between the punches 322 and the die plate 324. The tool holder 311 is secured to the underside of the tool assembly mounting bracket 102 and holds the tool body 321. The foil sheet 131 passes between the foil guard 323 and the die plate 324, and the die plate 324 and foil guard 323 are slideably coupled with the tool body 311 to allow them to slide together and position the foil sheet prior to the punches 322 pressing the foil sheet 131 against the die plate 324. The linear actuator 101 includes a lead screw 312 and a drive nut 313. The tool assembly mounting bracket 102 secures the tool holder 311 at one end, and is connected to the drive nut 313 at the other end. Linear movement of the dive 313 along the lead screw 312 slides the tool assembly mounting bracket 102 vertically on rails 109 mounted to the assembly mounting bracket 292.

In operation, the linear actuator 101 drives the die plate 324, via the tool holder 311, towards a rack 10 below die plate 324. The die plate 324 contacts the rack. With continued movement of the mounting bracket 102, the foil guard 323 moved close to the die plate 324, moving the foil sheet into close proximity with the foil guard 323, e.g., 0.5 mm. Continued movement of the tool body 311 presses the punches 322 against the foil sheet 131, and cutting holes (not shown) of the die plate 324 accept the punches to punch individual sealing sections (not shown) from the foil sheet 131.

Figure 4:
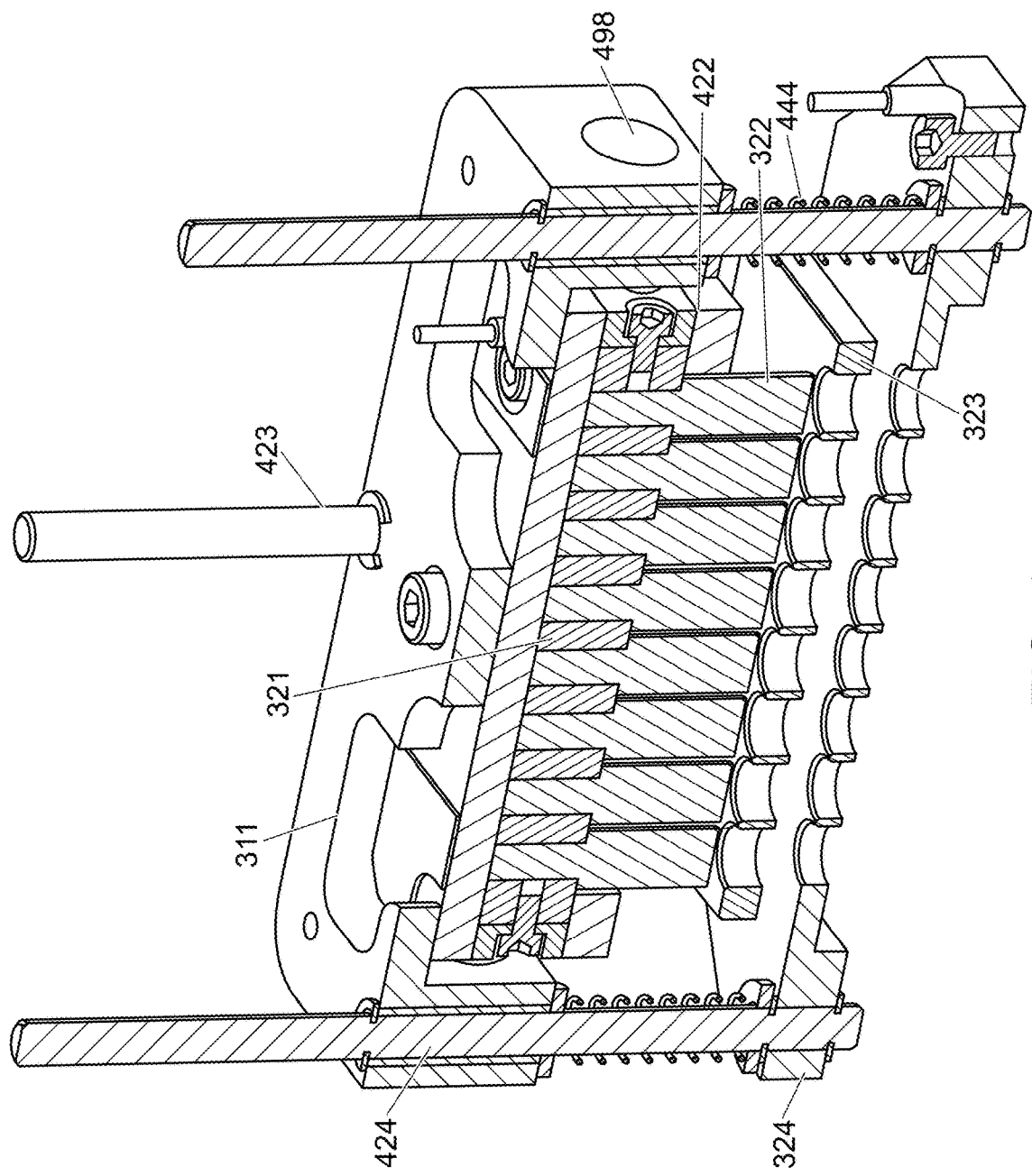
FIG. 4 is a cut-away illustration of the CPS tool assembly of FIG. 3

FIG. 4 is a cut-away illustration of a CPS tool assembly with heated punches embodiment. FIG. 4 shows a tool assembly 110 including a tool holder 311 supporting a tool body 321 including a plurality of heated punches 322. The tool holder 311 also includes a thermal isolation casing 422 around the plurality of heated punches 322 and two sets of sets of guide rods slideably coupling a die plate 324 and a foil guard 323 to the tool holder 311. Each die plate guide rail 424 includes a spring 444 between the die plate 324 and tool body 311 and a stop (shown as stop 592 in FIG. 5) opposite the tool body 311 nominally positioning the die plate 324 a distance away from the heated punches 322. The spring 444 applies a restoring force on the die plate 324 to return the die plate to the nominal position after the heated punches 322 are pressed towards the die plate 324 by a linear actuator 101 during a punching operation. Similarly, the foil guard guide rails 423 include springs (shown as springs 543 in FIG. 5) and stops (shown as stop 593 in FIG. 5) to nominally position the foil guide 323 away from the tool body 311 and apply a restoring force on the foil guide 323 to return the foil guide 323 to the nominal position after being translated towards the tool body 311 during a punching operation. When the tool assembly 110 closes, completing a punching operation, the punches 322 are penetrating the foil guard 323 and ultimately the die plate 324, when cutting through the foil sheet 131. The die plate 324 holds back the un-cut section of foil sheet 131 surrounding the punches 322, and spring 543 moves the foil guide away from the punches 322. When the punching process is done and the tool assembly 110 is moved away from a rack 20, the springs 444 open the tool assembly 110 by moving the die plate 324 away from the punches. In case there is too much friction or any misalignment for the springs to move the die plate and foil guard, the upper ends of the die plate and foil guard guides 423, 424 may be configured to hit the underside of the actuator mounting platform 108 and securely return the die plate and foil guard to their starting positions with the force of the linear actuator 101 (see FIG. 8A).

The tool body 311 is isolated from the tool holder 321 with the thermal casing 422 in order to minimize heat flow to the foil guard and die plate guides 424, 423. The thermal casing 422 isolates the heated punches 322 from the tool body 311 and reduces heat transfer from the heated punches 322 to the die plate 324 and foil guard 323. This helps maintain a temperature difference between the punches 322 and the die plate 324. Another optional feature that can improve temperature difference is a mirror finish (electro polish or other) of the foil guard 323. This mirror finish lowers heat transfer by radiation by shielding the die plate 324. One reason to keep the die plate relatively cold is to reduce potential thermal impact to the tube contents (i.e., the sample).

Figure 5:
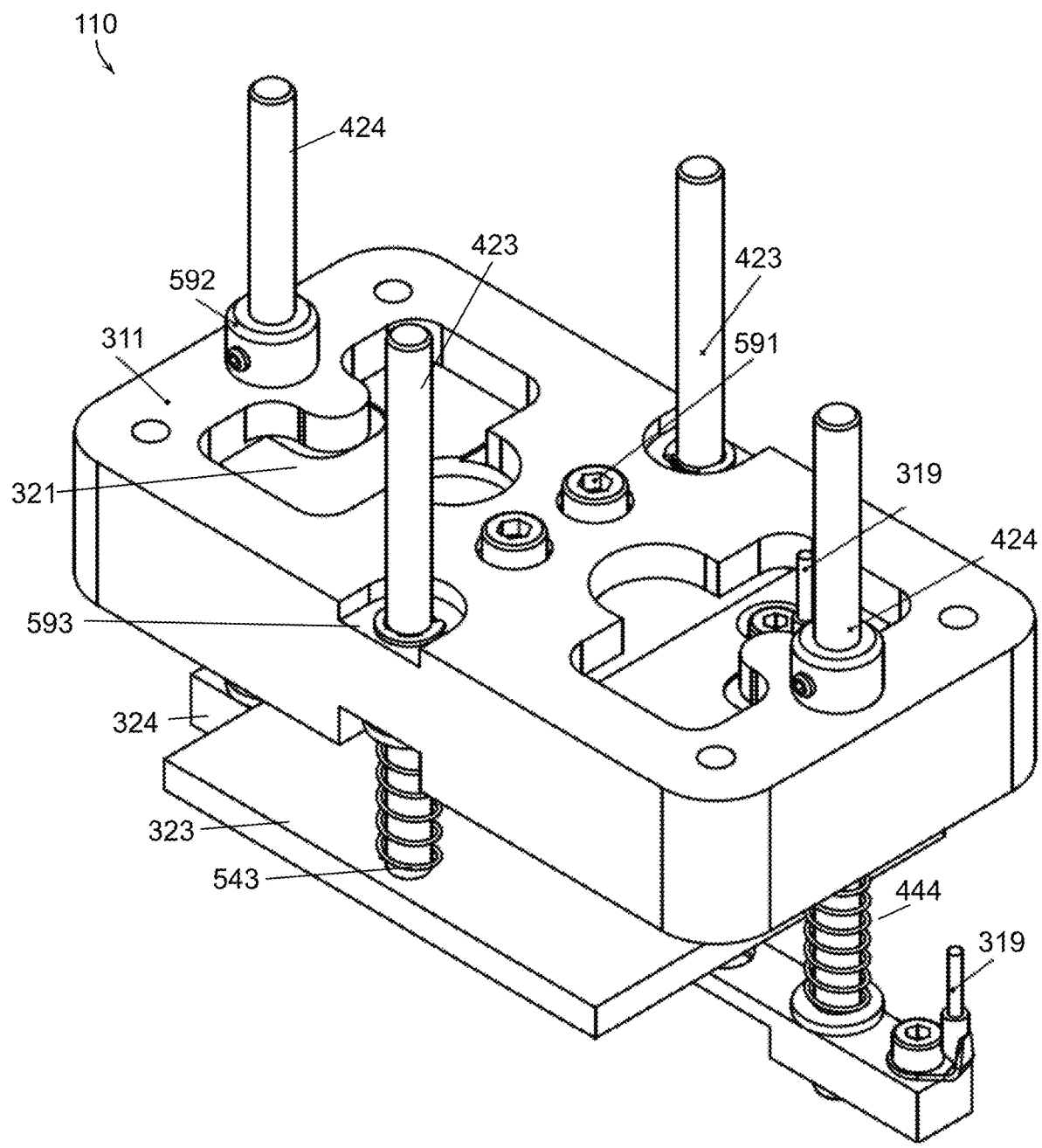
FIG. 5 is an isometric illustration of a CPS tool assembly embodiment.

FIG. 5 is an isometric illustration of a CPS tool assembly embodiment. FIG. 5 shows a tool assembly 110 including a tool holder 311 securing a tool body 321 with screws 591, a foil guard 323 slideably coupled to the tool holder 311 via guide rails 423, and a die plate 324 slideably coupled to the tool holder 311 via guide rails 424. The tool holder 311 includes a thermal sensor 319 sensing the temperature of the tool body 321, and the die plate includes a thermal 319 sensing the temperature of the die plate 324. The thermal sensor may be, for example, a thermocouple, a thermistor, or an infrared sensing device. The die plate 324 guide rails 424 include springs 444 and stops 592 positioning the die plate 324 in a rest position as shown. The die plate 324 springs 444 provide a restoring force on the die plate 324 when the die plate 324 is translated towards the tool holder 311, e.g., during a punching operation. The foil guard 323 guide rails 423 also includes springs 543 and stop 592 that position the foil guard in the nominal rest position, as shown. The springs 543 provide a restoring force on the foil guard 323 when then foil guard 323 is deflected by movement of the die plate 324 towards the tool holder 311.

Figure 6:
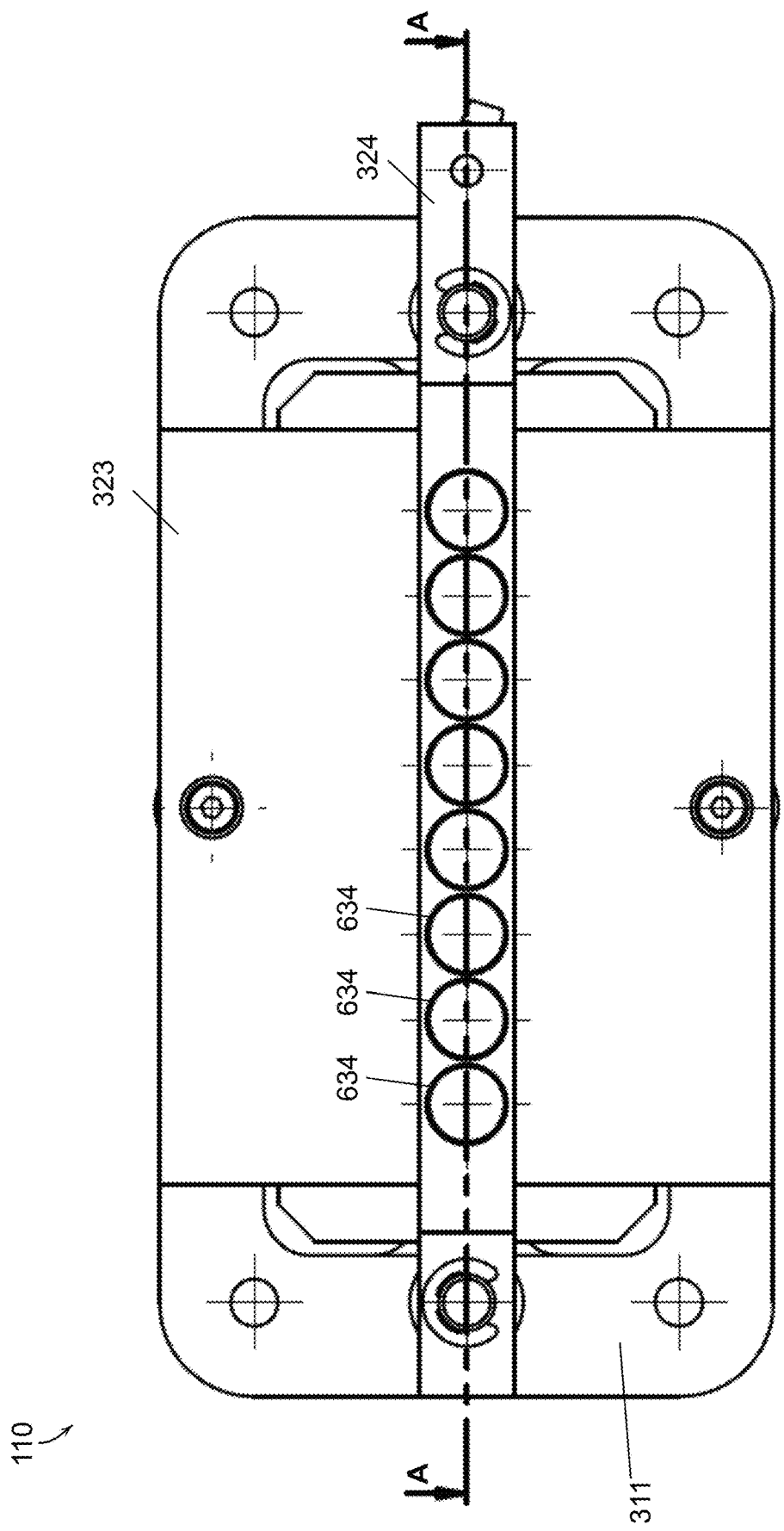
FIG. 6 is a bottom-view illustration of the CPS tool assembly embodiment of FIG. 5.

FIG. 6 is a bottom-view illustration of the CPS tool assembly embodiment of FIG. 5. FIG. 6 shows the tool assembly 110 includes the tool holder 311 with foil guard 323 and the die plate 324. The die plate 324 includes a plurality of cutting holes 634 configured to accept the corresponding plurality of punches 322. The configuration of the die plate as shown allows the tool assembly 110 to seal a single row of a sample storage tubes 20 positioned in a rack 10.

Figure 7A:
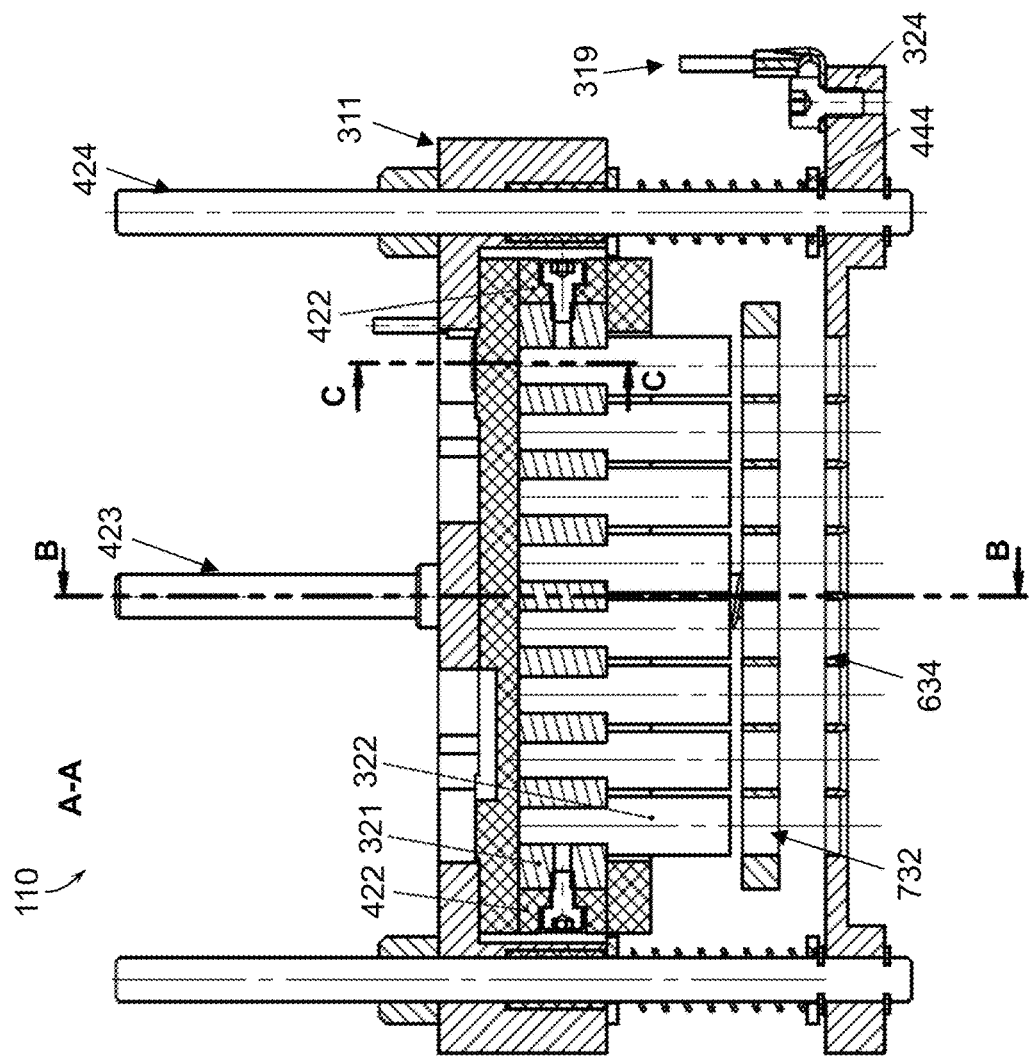
FIGS. 7A-B are cross-sections of the CPS tool assembly embodiment of FIG. 5.
Figure 7B:
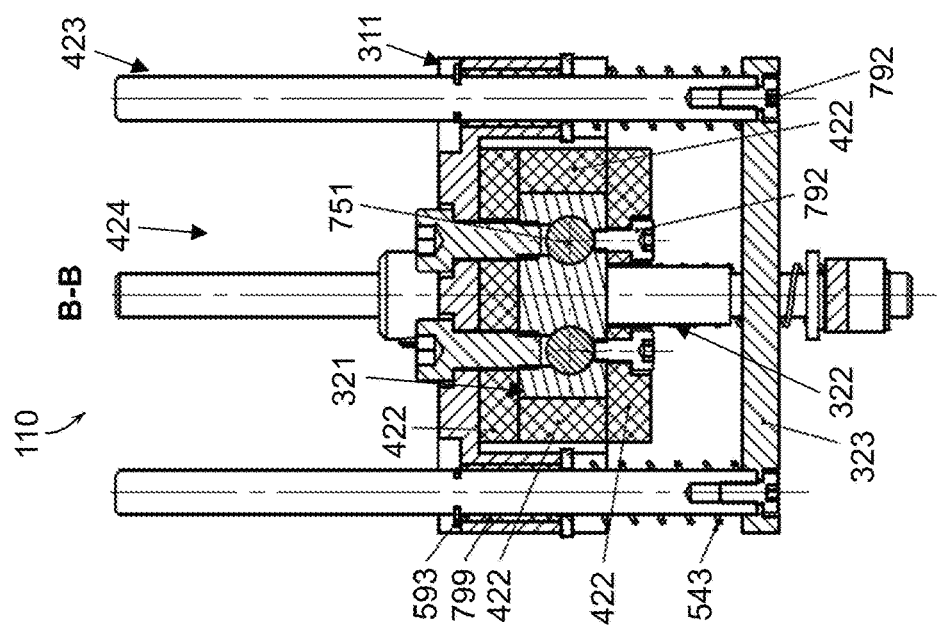

FIGS. 7A-B are cross-sections of the CPS tool assembly embodiment of FIG. 5. FIG. 7A is a cross-section of the tool assembly 110 though the long axis of the tool assembly 110, i.e., view "A" in FIG. 6. FIG. 7A shows the thermal insulation casing 422 insulating the tool body 321 from the tool holder 311 and the plurality of punches 323 aligned with corresponding through holes 732 in the foil guard 323 and cutting holes 634 of the die plate 324. FIG. 7B is a cross-section of the tool assembly 110 corresponding to view "B" in FIG. 7A. FIG. 7A shows the tool body 321 containing two heating units 751 extending along a length of the tool body 321 and providing thermal energy to the tool body and punches 322. The foil guard 323 guide rails 423 are slideably coupled with the tool holder using a bushing 799.

FIGS. 8A-B are cross-sections of a CPS device embodiment showing a CPS tool assembly positioned above a plurality of sample storage tubes in a rack. FIG. 8A shows the CPS device with the rack sled 140 positioning a row of sample storage tubes 20 under a die plate 324 of the tool assembly 110 prior to the CPS device 100 sealing the row of sample storage tubes 20. In FIG. 8B the die plate 324 is above the row of sample storage tubes 20 and the foil sheet 131 is between the die plate 324 and the foil guard 323. This is the configuration of the tool assembly 110 when the rack sled 140 delivers a row of sample storage tubes 20 to the tool assembly 110 to be sealed.

FIGS. 9A-B are cross-sections of a CPS device embodiment of FIG. 8A, showing the CPS tool assembly lowered by the liner actuator 101 with the die plate engaging the rack. From the CPS device 100 configuration shown in FIGS. 8A-B to the configuration shown in FIG. 9A and FIG. 9B, the linear actuator 101 drives the tool holder 311 towards the rack and engages the die plate 324 against the rack 10, the die plate 324 spring 444 applies a restoring force against the rack 10 as the tool holder 311 moves towards the rack. In this position shown, the cutting holes 634 of the die plate 324 encircle the tops of sample storage tubes 20 in the target row, and the foil sheet is positioned above the top surface of each of the sample storage tubes 20 in the target row. Additionally, the linear actuator 101 has continued to move the tool holder 311 towards the rack, which engages the foil guard 323 against the die plate 324. In this position, the foil guard may press directly against the foil sheet 131 at only the edges of the foil guard, i.e., in the regions outside of the path of the heated punches 322, to leave a small gap between the foil sheet on the foil guard directly above the top of the sample storage tubes 20 to prevent any small differences in length between each of the sample storage tubes 20 from causing unwanted bending or separating of the foil sheet 131 from the die plate 324.

FIGS. 10A-B are cross-sections of a CPS device embodiment of FIG. 8A, showing the CPS tool assembly lowered and the heated punches engaging the foil sheet. From the CPS device 100 configuration shown in FIGS. 9A-B to the configuration shown in FIG. 10A and FIG. 1B, the linear actuator 101 drives the tool holder 311 towards the rack until the heated punches 323 pass through the corresponding through holes 732 of the foil guard and contact the foil sheet 131.

FIGS. 11A-B are cross-sections of a CPS device embodiment of FIG. 8A, showing the CPS tool assembly lowered and the heated punches driven through to foil sheet and engaging the newly cut sealing section against the sample storage tubes. From the CPS device 100 configuration shown in FIGS. 10A-B to the configuration shown in FIG. 11A and FIG. 11B, the linear actuator 101 drives the tool holder 311 towards the rack and the heated punches 322 are driven through the foil sheet 131, the cutting holes 634 of the die plate 324 cutting sealing sections 1131 from the foil sheet 131. In the same motion, the heated punches 322 heat the sealing section 1131, melting a polyethylene layer on the bottom of the sections, and press the heated sealing sectioned 1131 against the top of the sample storage tubes 20.

FIGS. 12A-B are cross-sections of a CPS device embodiment of FIG. 8A showing the sample storage tubes pushed down against the rack holder and sealed by the heated punches. From the CPS device 100 configuration shown in FIGS. 811-B to the configuration shown in FIG. 12A and FIG. 12B, the linear actuator 101 continues to drive the tool holder 311 towards the rack and the heated punches 322 press the sample storage tubes 20 into the rack 20 until they contact the bottom plate 11. With the sample storage tubes 20 braced between the heated punches 322 and the bottom plate 11, the force of the linear actuator 101 and the heat from the heated punches 322 welds, e.g., creates a thermoseal, with the sealing sections 1131 against the top of the sample storage tubes 20. With the welding complete, the linear actuator 101 lifts the tool holder 311 away from the rack, which withdraws the heated punches 322 from the die plate 324, allows the foil guard 323 to move the punched foil sheet away from the heated punches 322, and returns the tool assembly 110 to the configuration shown in FIG. 8A-8B, at which point the foil transport drive 107 advances the foil sheet 131 though the tool assembly 110 to position an un-cut section of foil sheet 131 at the tool assembly 110 for a subsequent punching operation and moves a different row of sample storage tubes 20 under the tool assembly 110 to be sealed.

FIGS. 13A-B are cross-sections of a CPS device embodiment showing a CPS tool assembly engaged with two stop pillars of a thermal control assembly to place the heated punches in close thermal coupling with the die plate. FIG. 13A shows the die plate 324 contacting two stop pillars 1382. The stop pillars 1382 are part of a thermal control assembly (shown in FIG. 15) mounted to the tappet 146. In this manner, the belt drive motor 143 position the stop pillars 1382 under the die plate 324 and the linear actuator drives the tool holder 311 towards the stop pillars 1382 until the die plate stop and the heated punches 322 are moved into close thermal coupling with the die plate 324, shown more clearly in FIG. 13B. This position enables the heated punches 322 to transfer heat energy to the die plate 323, thereby raising the temperature of the die plate to maintain a desired temperature difference between the heated punches 322 and the die plate 324. The temperature difference may be sensed using the temperature sensors 319 on the tool body 312 and die plate 324. In FIG. 13B, the heated punches 322 are positioned inside the foil guard 323 and very close to the foil sheet 131 and die plate 324. The heated punches 322 don't contact the foil sheet 131 to avoid melting the polyethylene layer. This position may be used to initialize the CPS device 100 upon start up, where, for example, the die plate 324 may be at an ambient temperature.

Figure 14A:
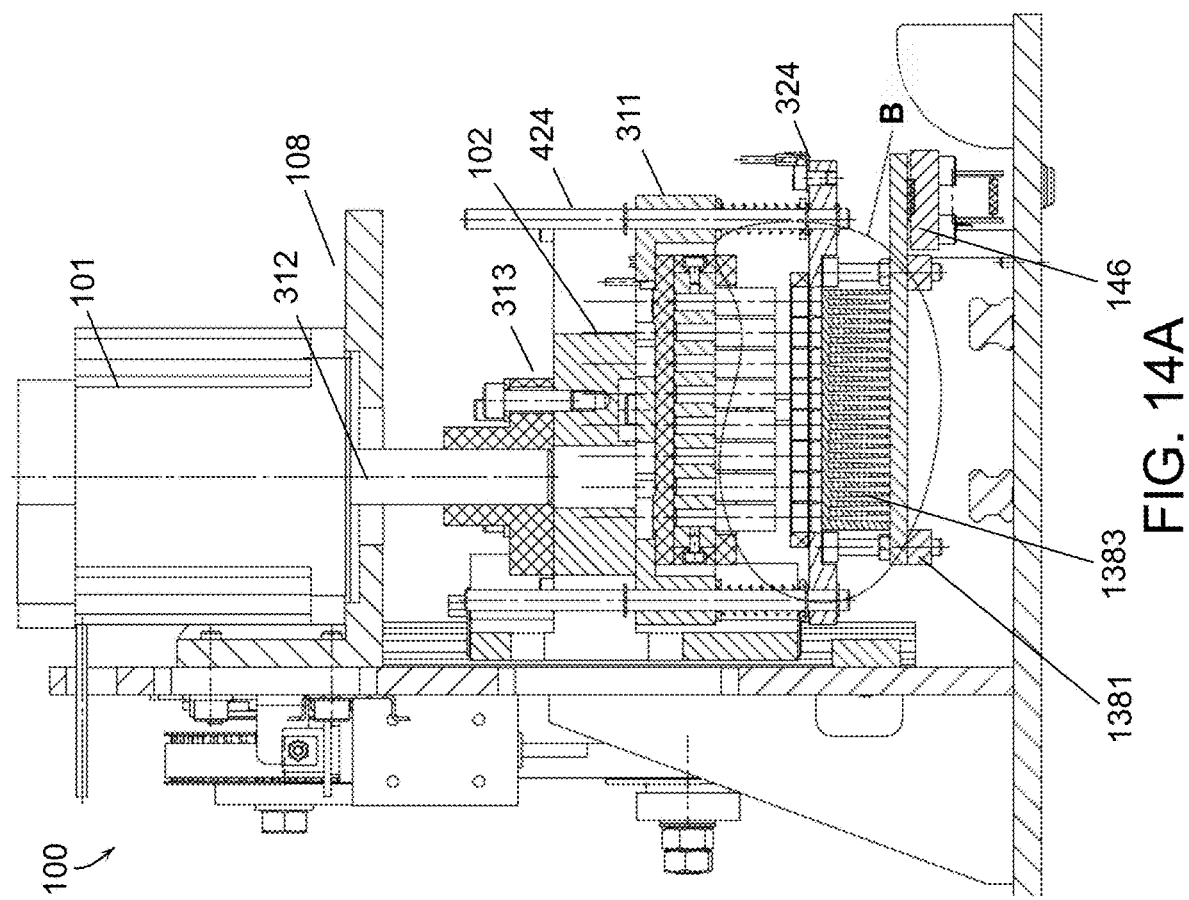
FIGS. 14A-B are cross-sections of a CPS device embodiment showing the die plate of a CPS tool assembly contacting a heat sink of a thermal control assembly to lower the temperature of the die plate.
Figure 14B:
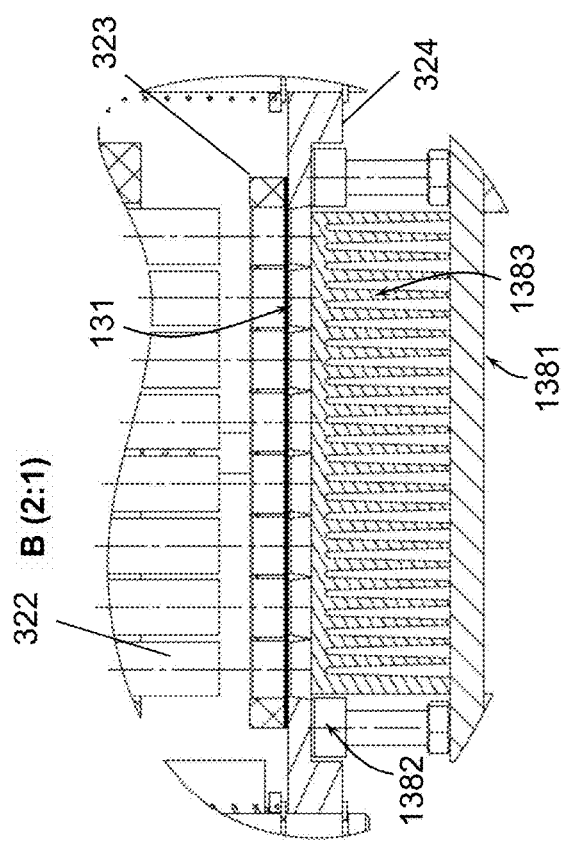

FIGS. 14A-B are cross-sections of a CPS device embodiment showing the die plate of a CPS tool assembly contacting a heat sink of a thermal control assembly to lower the temperature of the die plate. FIG. 14A shows the die plate 324 contacting a heat sink 1383. The heat sink is part of the thermal control assembly 1381 mounted to the tappet 146. In this manner, the belt drive motor 143 positions the heat sink 1383 under the die plate 324, and the linear actuator drives the tool holder 311 towards the heat sink until the die plate 324 contacts the heat sink, shown more clearly in FIG. 13B. This position enables die plate 324 to transfer heat energy to the heat sink 1383, thereby lowering the temperature of the die plate to maintain a desired temperature difference between the heated punches 322 and the die plate 324. The temperature difference may be sensed using the temperature sensors 319 on the tool body 312 and die plate 324. In FIG. 14B, the foil guard 323 is positioned against the die plate 324 to aid in lowering the temperature of the foil guard 323. As a result of the close proximity of the foil guard 323 to the heated punches 323, the foil guard 323 may be at least as hot as the die plate 324, and cooling the foil guard 323 may reduce the rate at which the die plate 324 is heated by the heated punches 322 during punching operations.

Figure 15:
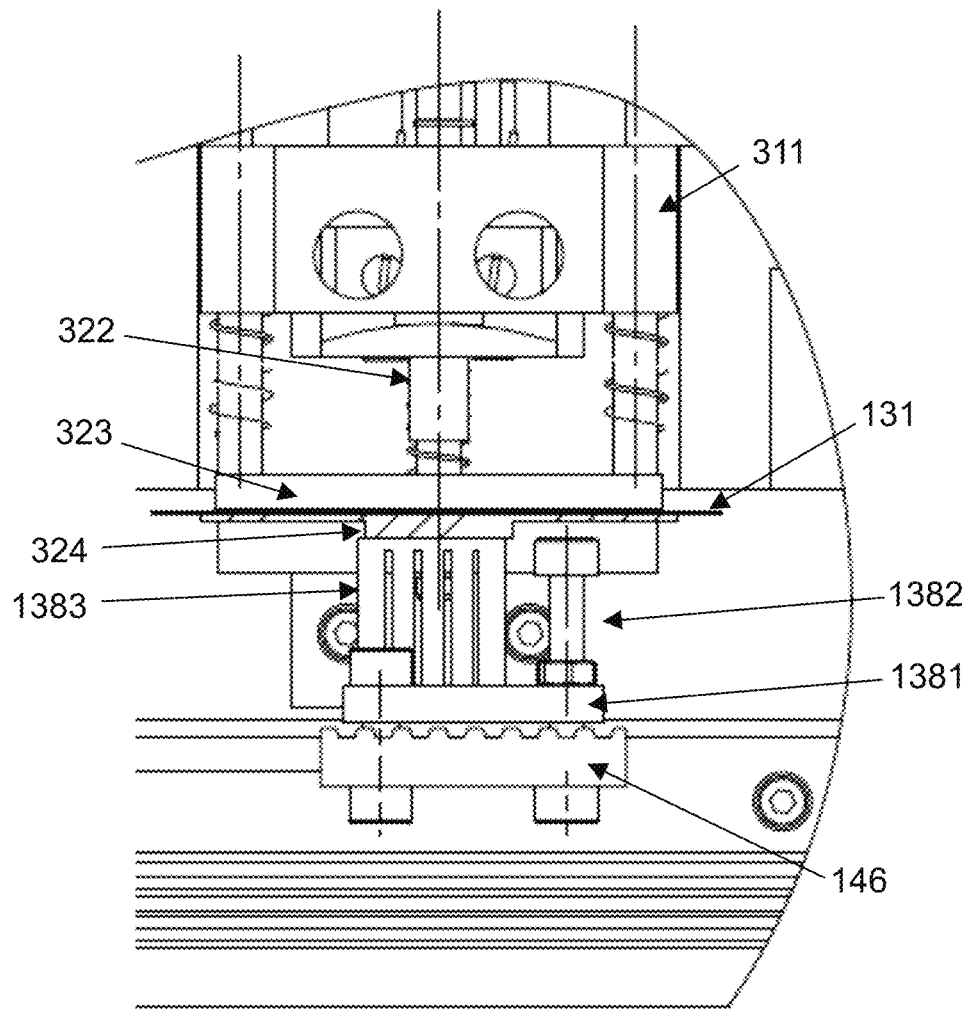
FIG. 15 is a cross-section view of the thermal control assembly of the CPS device embodiment of FIG. 14A showing the die plate contacting the heat sink.

FIG. 15 is a cross-sectional view of the thermal control assembly of the CPS device embodiment of FIG. 14A showing the die plate contacting the heat sink. FIG. 15 shows the thermal control assembly 1381 mounted to the tappet 146. The thermal control assembly 1381 includes a heat sink 1383 and stop pillars 1382 configured to engage the die plate 324. As shown, the heat sink 1383 is contacting the die plate 324, and the stop pillars 1382 are positioned to engage the die plate 324 after a small translation of the tappet 146 by the belt drive motor 143.

While this invention has been particularly shown and described with references to example embodiments thereof, it will be understood by those skilled in the art that various changes in form and details may be made therein without departing from the scope of the invention encompassed by the appended claims.

What is claimed is:

1. A method of sealing sample tubes, the method comprising the steps of:
   positioning a tool assembly above a rack, the rack holding a plurality of sample storage tubes;
   moving the tool assembly towards the rack, the moving engaging a die plate of the tool assembly against the rack;
   punching a plurality of heated punches through a foil sheet and corresponding cutting holes in the die plate to punch a plurality of sealing sections from the foil sheet;
   with the plurality of punches, pressing each of the plurality of sealing sections against a top end of each of the plurality of sample storage tubes to seal a top end of each of the sample storage tubes with the sealing section.

2. A method of sealing sample tubes, the method comprising the steps of:
   positioning a tool assembly above a rack, the rack holding a plurality of sample storage tubes;
   moving the tool assembly towards the rack, the moving engaging a die plate of the tool assembly against the rack;
   with the die plate engaging the rack, moving a foil guard of the tool assembly toward a foil sheet positioned between the die plate and the foil guard;
   punching a plurality of punches of the tool assembly through the foil sheet and corresponding cutting holes in the die plate to punch a plurality of sealing sections from the foil sheet; and
   with the plurality of punches, pressing each of the plurality of sealing sections against a top end of each of the plurality of sample storage tubes to seal a top end of each of the sample storage tubes with the sealing section.

3. A method of sealing sample tubes, the method comprising the steps of:
   positioning a tool assembly above a rack, the rack holding a plurality of sample storage tubes;
   moving the tool assembly towards the rack, the moving engaging a die plate of the tool assembly against the rack;
   with the die plate engaging the rack, moving a foil guard of the tool assembly toward a foil sheet positioned between the die plate and the foil guard, the foil sheet including a polymer layer facing the die plate; and
   punching a plurality of heated punches through the foil sheet and corresponding cutting holes in the die plate to punch a plurality of sealing sections from the foil sheet;
   with the plurality of heated punches, pressing the polymer layer of each of the plurality of sealing sections against a top end of each of the plurality of sample storage tubes to seal a top end of each of the sample storage tubes with the sealing section by welding the polymer layer of each sealing section to the top end of each of the sample storage tubes.

4. The method of claim 2, further including, with the die plate engaging the rack, pressing a foil sheet between the die plate and a foil guard of the tool assembly prior to the punching.

5. The method of claim 2, further including, with the die plate engaging the rack, continuing to move the tool assembly towards the rack to punch the plurality of punches through the foil sheet.

6. The method of claim 2, wherein, continuing to move the tool assembly towards the rack further includes applying a die plate restoring force on the die plate, the die plate restoring force moving the die plate away from the plurality of heated punches during movement of the tool assembly away from the rack.

7. The method of claim 2, further including, with the die plate engaging the rack, continuing to move the tool assembly towards the rack punches the plurality of punches through the foil sheet and moves the foil guard of the tool assembly toward the foil sheet.

8. The method of claim 7, wherein, continuing to move the tool assembly towards the rack further includes applying a die plate restoring force on the die plate and applying a foil guard restoring force on the foil guard, and, during movement of the tool assembly away from the rack, the foil guard restoring force moving the foil guard and the foil sheet away from the plurality of punches and the die plate restoring force moving the die plate away from the plurality of heated punches.

9. The method of claim 2, further including providing a bottom plate below the rack, and wherein pressing the sealing sections against the top end of a sample storage tube in the rack further includes moving a bottom end of the plurality of sample storage tubes against the bottom plate.

10. The method of claim 2, wherein the engaging a die plate of the tool assembly against the rack further includes surrounding each of the plurality of sample storage tubes with one of the plurality of cutting holes of the die plate.

11. The method of claim 1, further including:
    heating the plurality of heated punches to create a temperature difference between the die plate and the heated punches to prevent colliding of at least one of the plurality of heated punches with a die plate.

12. The device of claim 11, further including transferring heat to the die plate from the heated punches, the transferring heat maintaining the temperature difference between the temperature of the heated punches and the temperature of the die plate.

13. The method of claim 12, further including:
    sensing the temperature of the plurality heated punches;
    sensing the temperature of the die plate;
    wherein maintaining the temperature difference between the temperature of the heated punches and the temperature of the die plate further includes controlling a duration of close thermal coupling between the plurality of heated punches and the die plate to allow the plurality of heated punches to pass through the plurality of cutting holes.

14. The method of claim 11, further including:
    providing a heat sink adapted to receive the die plate and absorb heat energy from the die plate, wherein moving the tool assembly towards the heat sink engages the die plate of the tool assembly against the heat sink and passively cools the die plate; and
    providing a stop adapted to receive the die plate, wherein moving the tool assembly against the stop moves the plurality of heated punches into close thermal coupling with the die plate to passively heat the die plate.

15. The method of claim 1 wherein the foil sheet has a polymer layer facing the die plate.

* * * * *